(12) United States Patent
Nong et al.

(10) Patent No.: US 11,566,148 B2
(45) Date of Patent: Jan. 31, 2023

(54) INTERPENETRATING POLYMER NETWORKS

(71) Applicant: THE AUSTRALIAN NATIONAL UNIVERSITY, Acton (AU)

(72) Inventors: William Sai Yau Nong, Mainz (DE); Antonio Tricoli, O'Connor (AU); David Russell Nisbet, Palmerston (AU); Zbigniew Stachurski, Canberra (AU)

(73) Assignee: THE AUSTRALIAN NATIONAL UNIVERSITY, Acton (AU)

( * ) Notice: Subject to any disclaimer, the term of this patent is extended or adjusted under 35 U.S.C. 154(b) by 0 days.

(21) Appl. No.: 16/300,175

(22) PCT Filed: May 10, 2017

(86) PCT No.: PCT/AU2017/000103
§ 371 (c)(1),
(2) Date: Nov. 9, 2018

(87) PCT Pub. No.: WO2017/193157
PCT Pub. Date: Nov. 16, 2017

(65) Prior Publication Data
US 2019/0169464 A1 Jun. 6, 2019

(30) Foreign Application Priority Data
May 10, 2016 (AU) .................. 2016901726

(51) Int. Cl.
| | | |
|---|---|---|
| *C09D 175/14* | (2006.01) | |
| *C08G 18/12* | (2006.01) | |
| *C08G 18/48* | (2006.01) | |
| *C08G 18/32* | (2006.01) | |
| *C03C 17/32* | (2006.01) | |
| *C09D 133/06* | (2006.01) | |
| *C09D 175/08* | (2006.01) | |
| *C08G 18/65* | (2006.01) | |
| *C08J 3/24* | (2006.01) | |
| *C08G 18/76* | (2006.01) | |
| *C08G 18/67* | (2006.01) | |
| *C03C 17/00* | (2006.01) | |
| *C03C 17/30* | (2006.01) | |
| *C08G 18/24* | (2006.01) | |
| *C08G 18/40* | (2006.01) | |
| *C08G 18/62* | (2006.01) | |
| *C08G 18/66* | (2006.01) | |
| *C09D 5/00* | (2006.01) | |
| *C08K 3/36* | (2006.01) | |

(52) U.S. Cl.
CPC .......... *C09D 175/14* (2013.01); *C03C 17/007* (2013.01); *C03C 17/30* (2013.01); *C03C 17/322* (2013.01); *C08G 18/12* (2013.01); *C08G 18/246* (2013.01); *C08G 18/3206* (2013.01); *C08G 18/4063* (2013.01); *C08G 18/4854* (2013.01); *C08G 18/6229* (2013.01); *C08G 18/65* (2013.01); *C08G 18/6677* (2013.01); *C08G 18/673* (2013.01); *C08G 18/7614* (2013.01); *C08G 18/7621* (2013.01); *C08J 3/246* (2013.01); *C09D 5/00* (2013.01); *C09D 133/06* (2013.01); *C09D 175/08* (2013.01); *C03C 2217/445* (2013.01); *C03C 2217/47* (2013.01); *C03C 2217/48* (2013.01); *C03C 2217/76* (2013.01); *C03C 2218/112* (2013.01); *C08G 2270/00* (2013.01); *C08J 2333/12* (2013.01); *C08J 2375/04* (2013.01); *C08K 3/36* (2013.01)

(58) Field of Classification Search
CPC .. C09D 175/14; C09D 133/06; C09D 175/08; C09D 5/00; C08G 18/65; C08G 18/7621; C08G 18/673; C08G 18/246; C08G 18/4063; C08G 18/6229; C08G 18/6677; C08G 18/7614; C08G 18/4854; C08G 18/3206; C08G 18/12; C08G 2270/00; C08J 3/246; C08J 2333/12; C08J 2375/04; C03C 17/007; C03C 17/30; C03C 17/322; C03C 2217/445; C03C 2217/47; C03C 2217/48; C03C 2217/76; C03C 2218/112; C08K 3/36
See application file for complete search history.

(56) References Cited

U.S. PATENT DOCUMENTS

| | | | | |
|---|---|---|---|---|
| 5,763,529 | A | * | 6/1998 | Lucas .................. C08F 283/00 524/197 |
| 6,635,706 | B1 | | 10/2003 | Petschke et al. |
| 6,858,284 | B2 | | 2/2005 | Nun et al. |
| 2007/0298216 | A1 | * | 12/2007 | Jing ........................ B05D 5/08 428/141 |

(Continued)

FOREIGN PATENT DOCUMENTS

| | | |
|---|---|---|
| CN | 101165075 A | 4/2008 |
| WO | 2013146726 A1 | 10/2013 |

OTHER PUBLICATIONS

Rahmawan et al., "Self-assembly of nanostructures towards transparent, superhydrophobic surfaces", J. Mater. Chem. A., vol. 1, pp. 2955-2969, Nov. 12, 2012.

(Continued)

*Primary Examiner* — Nathan L Van Sell
(74) *Attorney, Agent, or Firm* — McKee, Voorhees & Sease, PLC

(57) ABSTRACT

The invention relates to a film comprising an interpenetrating network, its uses and processes for making the same. The film produced displays good durability, chemical resistance and transparency. The film is produced from an interpenetrating network formed as a colloidal suspension in an organic solvent and a particulate solid.

15 Claims, 19 Drawing Sheets

(56) References Cited

U.S. PATENT DOCUMENTS

| | | | | |
|---|---|---|---|---|
| 2013/0251948 A1* | 9/2013 | Lyons | ............... | B08B 17/065 |
| | | | | 428/148 |
| 2014/0113144 A1 | 4/2014 | Loth et al. | | |
| 2014/0127516 A1* | 5/2014 | Wang | ............... | C08J 7/042 |
| | | | | 428/422 |
| 2014/0162022 A1* | 6/2014 | Nowak | ............... | C09D 175/04 |
| | | | | 428/145 |
| 2015/0284614 A1* | 10/2015 | Gross | ............... | C09D 175/04 |
| | | | | 428/220 |
| 2015/0315527 A1* | 11/2015 | Malaba | ............... | C08G 18/4238 |
| | | | | 524/251 |
| 2016/0009971 A1* | 1/2016 | Wang | ............... | C08G 18/4018 |
| | | | | 428/314.4 |
| 2016/0160436 A1* | 6/2016 | Lyons | ............... | B82Y 40/00 |
| | | | | 442/62 |
| 2017/0002230 A1* | 1/2017 | Nowak | ............... | C08G 18/6225 |
| 2017/0096568 A1* | 4/2017 | Nowak | ............... | C09K 3/18 |
| 2018/0016383 A1* | 1/2018 | Gross | ............... | C09D 7/70 |

OTHER PUBLICATIONS

Wong et al., "Ultra-Durable and Transparent Self-Cleaning Surfaces by Large-Scale Self-Assembly of Hierarchical Interpenetrated Polymer Networks", Applied Materials & Interfaces, vol. 8(21), pp. 13615-13623, May 20, 2016.

JPO Office Action, Patent Application No. 2018-559269, "Notification of Reasons for Refusal" (translation), Dispatch No. 089342, Dispatch Date: Mar. 9, 2021, 11 pages.

\* cited by examiner

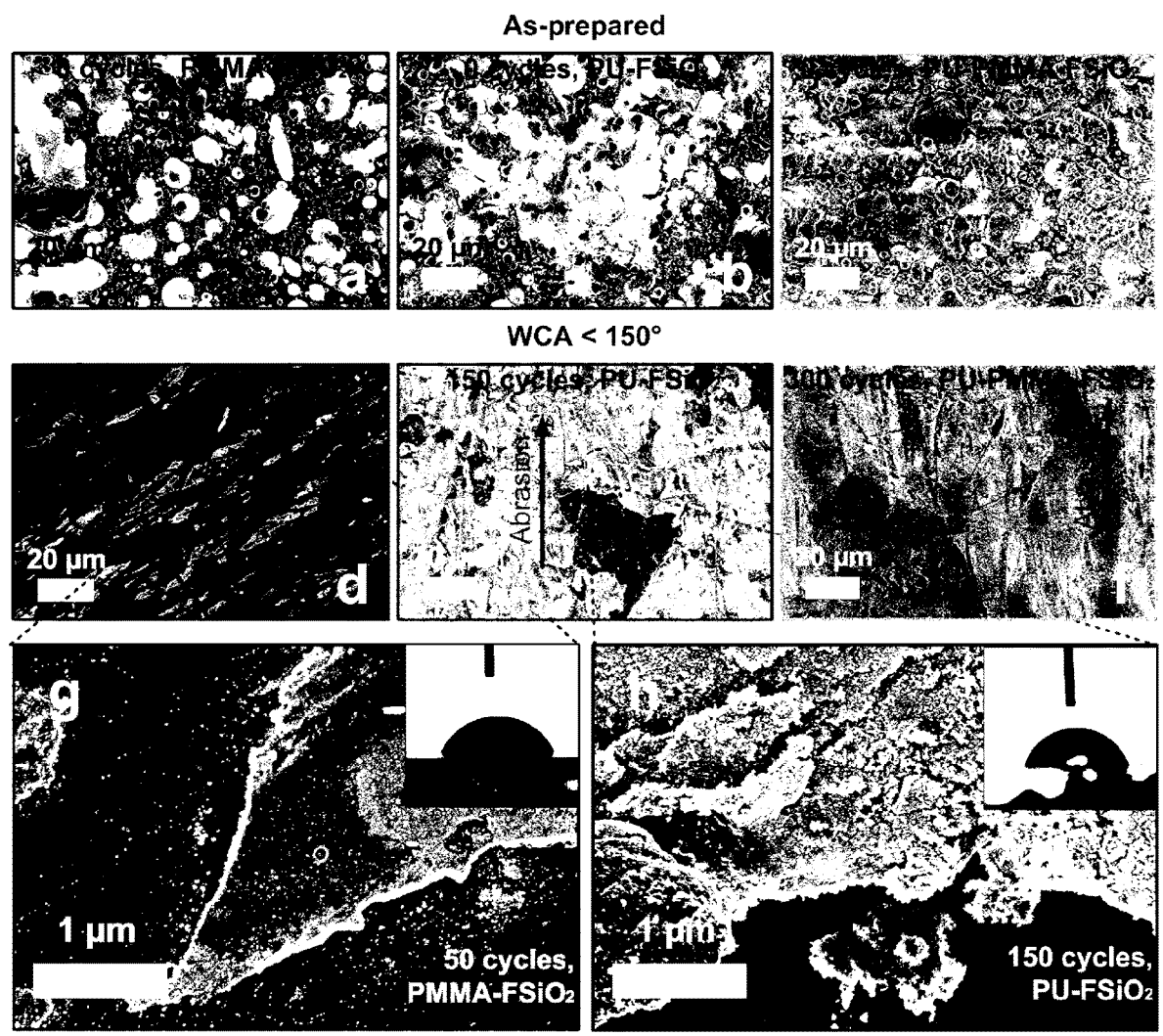
Figure 17:S16.
PU-PMMA-FSiO2
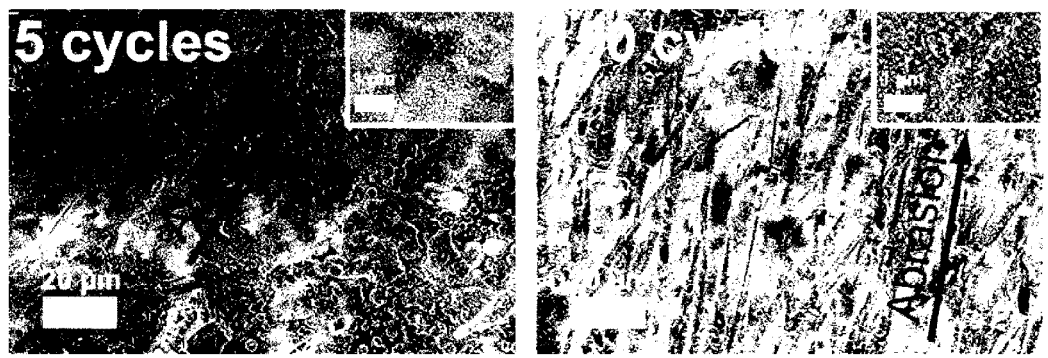
Figure 18

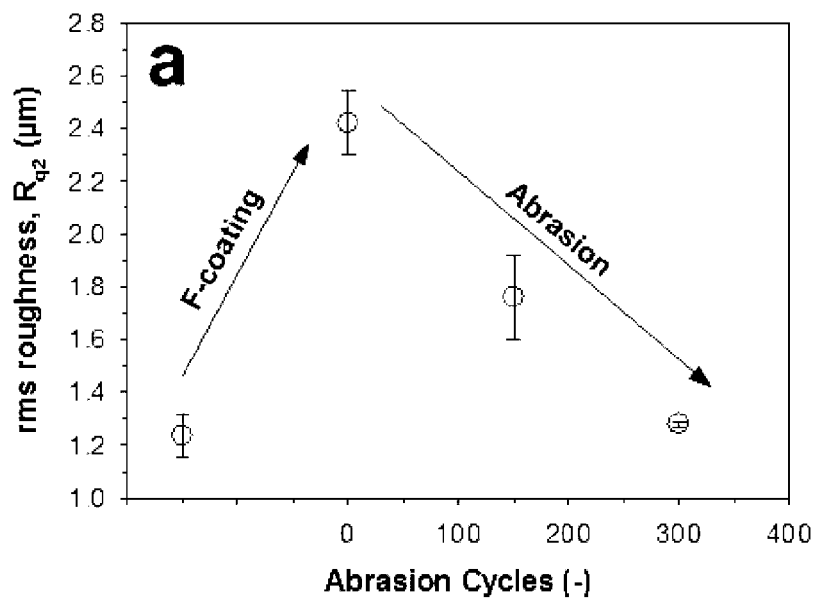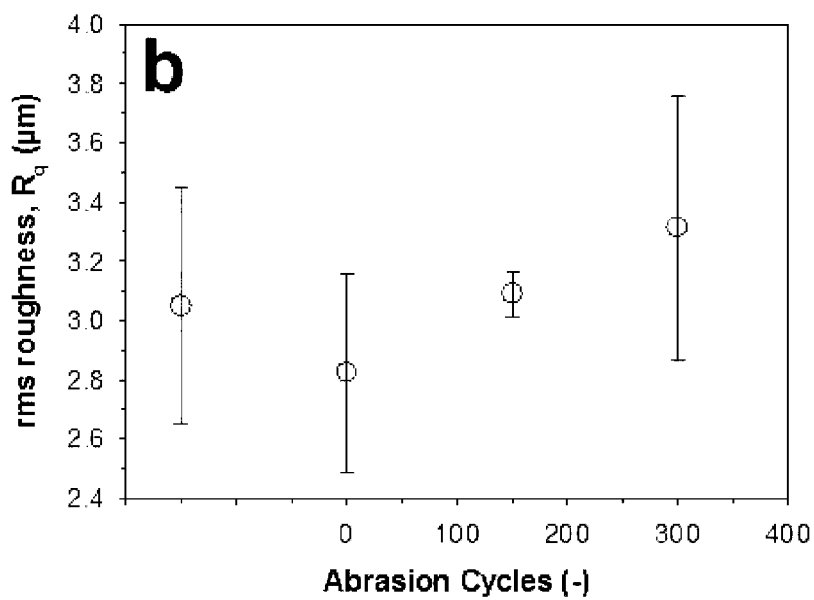
Figure 19

INTERPENETRATING POLYMER NETWORKS

FIELD

The invention relates to interpenetrating polymer networks and to films made therefrom.

BACKGROUND

Natural self-cleaning surfaces, such as the lotus leaf, rely on the spontaneous formation of rolling water droplets that suspend and trap contaminants enabling their facile removal. The required extreme non-wetting effect is attained through a combination of surface texturing and chemistry that results in a Cassie-Baxter wetting state. The durability of this superhydrophobic state is ensured by the cohesiveness and self-healing properties of organic tissues. Synthetic superhydrophobic textures have been made that mimic and surpass natural self-cleaning, however, the structural stability of such structures is, often, insufficient for real-world applications. The few robust structures that have demonstrated industrial-standard abrasion resilience remain highly dependent on substrate type, or are limited by optical transparency. Self-healing super-hydrophobic materials instead often require regeneration through external stimuli and are commonly based on more laborious multi-steps processes. In addition, few surfaces have demonstrated stable sliding angle (SA) and contact angle hysteresis (CAH) during abrasion, both of which are fundamental for achieving a pristine lotus-effect (SA<10°) and efficient self-cleaning. Amongst known superhydrophobic materials, fluoro-functionalized nanostructured silica represents one of the foremost exploited class of materials, but is impeded by its poor mechanical durability. These standing challenges limit the usefulness of existing superhydrophobic coatings, and durable superhydrophobicity remains an actively researched area.

Incorporation of elastic-plastic compounds in sophisticated hierarchical textures required for attainment of a perfect Cassie-Baxter wetting state has the potential to enhance their robustness and long-term use. Elastically and plastically deformable hierarchical structures and materials that provide high optical transparency are challenging to design and synthesize.

Interpenetrated polymer networks (IPNs) represent a class of extremely tough polymers, due to the atomic level interlacing of polymeric chains, forming toughened polymeric nets without the need for covalent bonding between the chains. However, their synthesis is sensitive to full gelation, and requires careful control of the net-to-net entanglement. Two component IPNs are commonly made of a dispersed phase integrated within a more dominant continuous phase, and leverage on the benefits of both cross-linked constituents. In particular, the polyurethane-acrylic (PU-PMMA) system has drawn much attention due to the contrasting soft-rubbery and stiff properties exhibited by the two individual constituents. However, there is a lack of methods to co-texture large-scale surfaces with IPNs.

SUMMARY OF INVENTION

In a first aspect of the invention there is provided a process for making a coating comprising an interpenetrating polymer network, the process comprising applying a colloidal suspension to a surface to produce a coated surface, wherein the colloidal suspension comprises colloidal particles suspended in an organic solvent, and wherein the colloidal particles comprise an interpenetrating polymer network, and; applying a particulate solid to the coated surface, wherein substantially the entire surface of the particulate solid is functionalised to be hydrophobic so as to form a coating.

The following options may be used in conjunction with the first aspect, either individually or in any suitable combination.

The process may comprise applying the colloidal suspension to a surface so as to form a film on said surface. The applying may comprise spraying the suspension onto the surface. It may comprise dipcoating, spincoating, dropcasting or electrospinning. The viscosity of the suspension may be less than 1000 cP. The colloidal suspension may have a solids content between about 5% to about 25%.

The hydrophobic particulate solid may have a mean particle size of between about 5 and about 20 nm. It may be a hydrophobic silica. It may be a perfluoroalkyl-functionalised fumed silica. The process may comprise reacting fumed silica with a hydrophobing agent so as to produce the hydrophobic particulate solid. The hydrophobing agent may be a perfluoroalkylsilane. It may be 1H,1H,2H,2H-perfluorooctyldimethylchlorosilane. It may be some other silane bearing a hydrophobic group (as detailed elsewhere in respect of groups on the surface of the particles). It may be an alkylsilane. It may be an alkyldimethyl silane. It may be an alkyldimethylchlorosilane. It may be an alkylmethyldichlorosilane. It may be a dialkyldichlorosilane. It may be an alkyltrichlorosilane. In these reagents, the alkyl group may be halogenated, e.g. fluorinated. It may be perfluorinated. It may be perfluorinated on the terminal carbon atom (i.e. it may have a trifluoromethyl terminus). It may be perfluorinated on the terminal and penultimate carbons. It may be perfluorinated on the terminal, penultimate and antepenultimate carbons. The hydrophobic particulate solid may be applied to the coated surface as a suspension. The suspension may be applied by spraying. The suspension may be in an organic solvent. The organic solvent may be polar or it may be non-polar. The solvent may be water miscible. The solvent may be acetone. The hydrophobic particulate solid may be applied to the coated surface dry, i.e. may be applied by electrospraying or by some other suitable process. The hydrophobic particulate solid, when applied to the film, may be partially wetted by the polymer mixture. It may be completely wetted by the polymer mixture. It may be wetted before curing and/or drying of the polymers such that, when cured, the hydrophobic solid is at least partially embedded in the polymer surface. The embedded particles may be abrasion resistant. The hydrophobic solid suspension may be applied to the film by spraying, dip-coating or some other suitable method known in the art.

The process may alternatively comprise applying to said film a suspension of a hydrophilic particulate solid. The hydrophilic particulate solid may have a mean particle size of between about 5 and about 20 nm. It may comprise spherical silica particles. The hydrophilic particulate solid may be suspended in an organic solvent before applying to the coated surface. The organic solvent may be a polar organic solvent. The solvent may be acetone. The hydrophilic solid suspension may be applied to the film by spraying, dip-coating or some other suitable method known in the art. The hydrophilic particulate solid, when applied to the film, may be partially wetted by the polymer mixture. It may be completely wetted by the polymer mixture. It may be wetted before curing and/or drying of the polymers such that, when cured and/or dried, the hydrophilic solid is at least partially embedded in the polymer surface. The embedded particles may be abrasion resistant. This may result in the formation of a superhydrophilic film.

The process may additionally comprise hydrophobizing the spherical silica particles after their application to the film so as to generate a superhydrophobic film. The step of hydrophobizing may comprise applying to said particles a hydrophobing agent (as described elsewhere herein). The hydrophobizing agent may be, or may comprise, a perfluoroalkylsilane. The step of applying the hydrophobizing agent may comprise spraying the hydrophobizing agent, either neat or as a solution, onto the film and/or the hydrophilic particles.

The process may comprise a period of waiting between the application of the polymer mixture and the application of the hydrophobic solid so that the polymer mixture partially dries and/or cures. This waiting period may be between 10 minutes and 40 minutes.

In a second aspect of the present invention, there is provided a process for making the colloidal suspension of the first aspect, said process comprising preparing a polymerisation mixture comprising: a non-crosslinking acrylic monomer, a cross-linking acrylic monomer, a free radical initiator, a polyol, an oligomeric or polymeric diol, an isocyanate having at least two isocyanate groups per molecule, and a solvent; adding a polyurethane polymerisation catalyst to the polymerisation mixture; and heating the polymerisation mixture to at least a 10 hour half-life temperature of the free radical initiator so as to form the interpenetrating polymer network.

The following options may be used in conjunction with the first aspect, either individually or in any suitable combination.

The following options may be used in conjunction with the second aspect, either individually or in any suitable combination.

The process may comprise preparing a first mixture comprising the non-crosslinking acrylic monomer, the cross-linking acrylic monomer and the free radical initiator and a second mixture comprising the polyol, the oligomeric or polymeric diol and the isocyanate having at least two isocyanate groups per molecule, and combining the first and second mixtures to form the polymerisation mixture. In this instance, either the first mixture or the second mixture comprises the solvent, or else the first mixture comprises a first solvent and the second mixture comprises a second solvent and the solvent comprises both the first solvent and the second solvent. The first solvent and the second solvent may be the same or may be different.

The non-crosslinking acrylic monomer may be an acrylate ester or a methacrylate ester. The crosslinking acrylic monomer may be a diol di(meth)acrylate, a triol tri(meth)acrylate, a tetraol tetra(meth)acrylate or a pentaol penta(meth)acrylate. The free radical initiator may have a 10 hour half-life temperature of from about 50 to about 70° C. It may be an azo initiator. The 10 hour half-life temperature may be dependent on the medium in which it is used.

The polyol may be a triol. It may be a tetraol. It may be a pentaol. The oligomeric or polymeric diol may be a polyether diol. The isocyanate may be a bisisocyanate.

The solvent may be such that it dissolves each of the non-crosslinking acrylic monomer, the cross-linking acrylic monomer, the free radical initiator, the polyol, the oligomeric or polymeric diol and the isocyanate having at least two isocyanate groups per molecule. Alternatively one or more of these may be undissolved but dispersed in the solvent. The solvent may be organic or it may be aqueous.

The polyurethane catalyst may be a diorganotin (IV) salt.

The process may comprise preparing a first mixture comprising the non-crosslinking acrylic monomer, the cross-linking acrylic monomer and the free radical initiator in a first solvent and a second mixture comprising the polyol, the oligomeric or polymeric diol and the isocyanate having at least two isocyanate groups per molecule in a second solvent and combining the first and second mixtures to form the polymerisation mixture. In this case the solvent comprises both the first solvent and the second solvent.

The step of heating may be conducted in the dark.

In one embodiment there is provided a process for making a colloidal suspension of the first aspect, the colloidal suspension comprising an interpenetrating polymer network, the process comprising preparing a polymerisation mixture of: a non-crosslinking (meth)acrylate ester, a triol tri(meth)acrylate, an azo initiator having a 10 hour half-life temperature of from about 50 to about 70° C., a triol, an oligomeric polyether diol, an isocyanate having at least two isocyanate groups per molecule, and a solvent; adding a diorganotin (IV) salt; and heating the polymerisation mixture to at least the 10 hour half-life temperature of the azo initiator.

In another embodiment there is provided a process for making a colloidal suspension of the first aspect, the colloidal suspension comprising an interpenetrating polymer network comprising preparing a first mixture comprising a non-crosslinking (meth)acrylate ester, a triol tri(meth)acrylate and an azo initiator having a 10 hour half-life temperature of from about 50 to about 70° C. in a first solvent, and a second mixture comprising a triol, an oligomeric polyether diol and an isocyanate having at least two isocyanate groups per molecule in a second solvent; combining the first and second mixtures to form a polymerisation mixture; adding a diorganotin (IV) salt to the polymerisation mixture; and heating said polymerisation mixture to at least the 10 hour half-life temperature of the azo initiator.

In other embodiments there is provided a process for making a colloidal suspension of the first aspect, the colloidal suspension comprising an interpenetrating polymer network comprising preparing a polymerisation mixture of: a non-crosslinking (meth)acrylate ester, a triol tri(meth)acrylate, an azo initiator having a 10 hour half-life temperature of from about 50 to about 70° C., a triol, an oligomeric polyether diol, an isocyanate having at least two isocyanate groups per molecule, and a solvent; adding a diorganotin (IV) salt; and heating the polymerisation mixture to at least the 10 hour half-life temperature of the azo initiator. The resulting colloidal is then applied to a surface and allowed to partially dry for a period of about 10 to about 40 minutes. At that time, a suspension of a particulate solid of particle size about 5 to about 20 nm may be applied to the film. If the particulate solid is hydrophilic, e.g. spherical silica particles, this may result in a superhydrophilic surface. If the particulate solid is hydrophobic, e.g. hydrophobic fumed silica particles, this may result in a superhydrophobic surface.

In a third aspect of the invention there is provided a colloidal suspension comprising colloidal particles which comprise an interpenetrating polymer network of a polyurethane and a polyacrylate. The suspension may be made by the process of the second aspect. The process of the second aspect may be suitable for making the film of the first aspect.

In a fourth aspect of the invention there is provided a film comprising an interpenetrating polymer network of polyurethane and a polyacrylate. The film may have a microroughness of at least about 2500 nm. The film may be made by applying the colloidal suspension of the third aspect to a surface and allowing said film to dry and/or cure.

In a fifth aspect of the invention there is provided a film comprising an interpenetrating polymer network of polyurethane and a polyacrylate and having a surface layer comprising a hydrophobic particulate solid.

The following options may be used in conjunction with the fifth aspect either individually or in any suitable combination.

The hydrophobic particulate solid may have a mean particle size of between about 5 and about 20 nm. It may be a hydrophobic silica. It may be a perfluoroalkyl-functionalised fumed silica. It may be a 1H,1H,2H,2H-perfluorooctyldimethylsilylated fumed silica.

The film may have a static water contact angle of at least 150°. It may have a water sliding angle of less than about 10°.

In a sixth aspect of the invention there is provided a method of rendering a surface superhydrophobic comprising forming a film thereon, said film comprising an interpenetrating polymer network of polyurethane and a polyacrylate and having a surface layer comprising a hydrophobic particulate solid and said film having a static water contact angle of at least about 150°.

The following options may be used in conjunction with the sixth aspect, either individually or in any suitable combination.

The forming may comprise applying a colloidal suspension comprising colloidal particles which comprise an interpenetrating polymer network of a polyurethane and a polyacrylate to said surface and applying a suspension of a hydrophobic particulate solid to said applied suspension.

The hydrophobic particulate solid may have a mean particle size of between about 5 and about 20 nm. It may be a hydrophobic silica. It may be a perfluoroalkyl-functionalised fumed silica. It may be a 1H,1H,2H,2H-perfluorooctyldimethylsilylated fumed silica.

The method may comprise the step of waiting following the application of the suspension according to the first aspect before application of the suspension of hydrophobic particles. The waiting may be for a period of from about 10 to about 40 minutes.

Either or both of the steps of applying may comprise spraying.

In a further aspect of the invention there is provided a film comprising an interpenetrating polymer network of polyurethane and a polyacrylate and having a surface layer comprising a hydrophilic particulate solid.

The hydrophilic particulate solid may have a mean particle size of between about 5 and about 20 nm. It may be a hydrophilic silica. The film may have a water contact angle of less than about 10°.

In yet a further aspect of the invention there is provided a method of rendering a surface superhydrophilic comprising forming a film according to the above aspect on said surface. The step of forming may comprise applying a suspension comprising colloidal particles which comprise an interpenetrating polymer network of a polyurethane and a polyacrylate to said surface and applying a suspension of a hydrophilic particulate solid to said applied suspension.

The hydrophilic particulate solid may have a mean particle size of between about 5 and about 20 nm. It may be hydrophilic silica, e.g. a colloidal silica. The method may comprise the step of waiting following the application of the suspension before application of the suspension of hydrophilic particles, said waiting being for a period of from about 10 to about 40 minutes. Either or both of the steps of applying may comprise spraying.

In an embodiment of the invention disclosed herein, there is provided a process for making a coating comprising an interpenetrating polymer network, said process comprising the steps of: applying a colloidal suspension to a surface to produce a coated surface, wherein the colloidal suspension comprises colloidal particles suspended in an organic solvent, and wherein the colloidal particles comprise an interpenetrating polymer network, and; applying a particulate solid to the coated surface, wherein substantially the entire surface of the particulate solid is hydrophilic.

This embodiment may be prepared using processes and materials described in the other embodiments and aspects described above.

BRIEF DESCRIPTION OF DRAWINGS

FIG. 17: Low Magnification SEM images of (a-c) as-prepared and (d-f) cycled-to-failure (WCA<150°) interfaces—(a,d) PMMA-FSiO$_2$, (b,e) PU-FSiO$_2$ and (c,f) PU-PMMA-FSiO$_2$ IPNs. (g) PMMA-FSiO$_2$ at the point of failure (50 cycles). (h) PU-FSiO$_2$ at the point of failure (150 cycles).

FIG. 18: Intermediate cyclic damages of PU-PMMA-F—SiO$_2$ coatings from the 5$^{th}$ cycle up to the 150$^{th}$ cycle, with negligible damages to the PU-PUMMA IPN-F—SiO$_2$.

FIG. 19: Impacts of F—SiO$_2$ coating and abrasion cycling on WLI-measured root-mean-square (rms) roughness at (a) 500× magnification and (b) 200× magnification. rms roughness measured at 500× magnification revealed a nano-level impacted interface, where abrasion was noted to gradually decrease rms roughness, and thus superhydrophobicity. No trend was reasonably established at 200× magnification, indicative of negligible micro-level impacts of abrasion on the interface.

DESCRIPTION OF EMBODIMENTS

Figure 1:
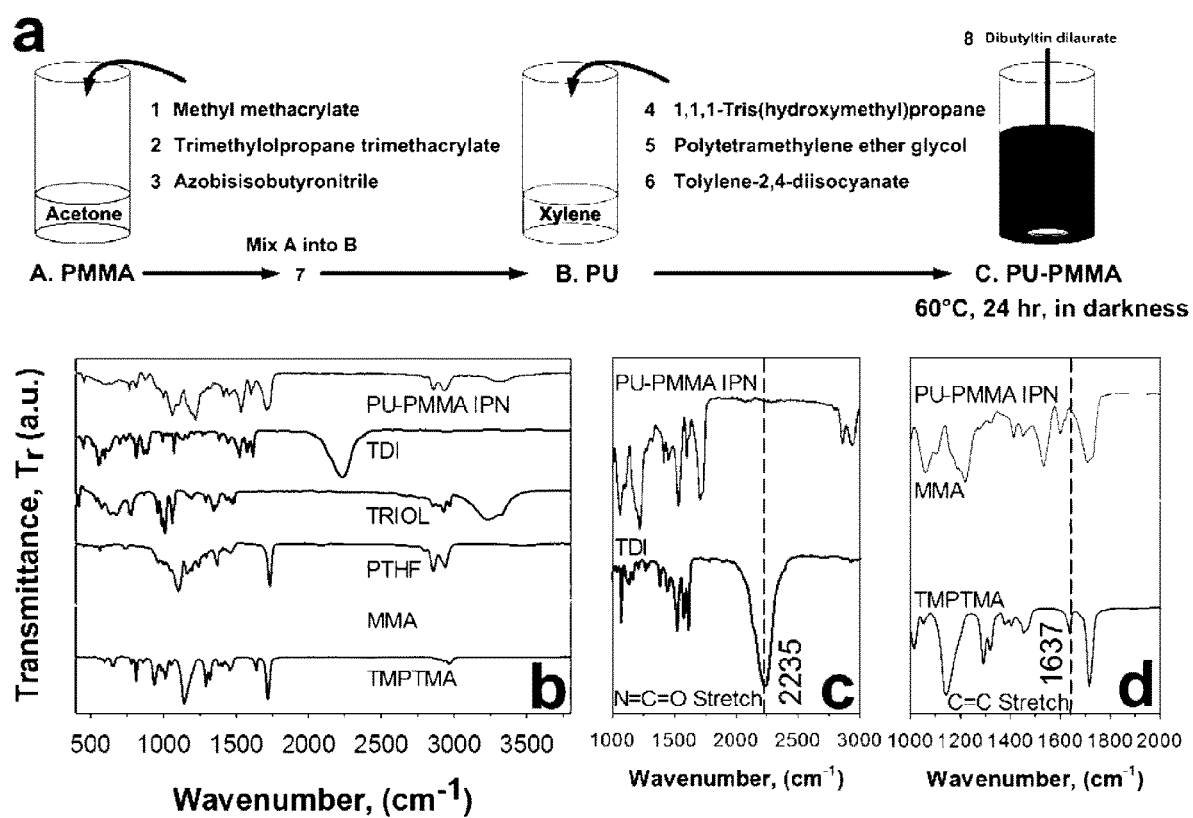
FIG. 1: (a) 2-pot synthesis of urethane and acrylic based sols which were mixed and reacted together to form a sprayable PU-PMMA colloid mix. (b) Spectroscopic analysis of PU-PMMA IPN and the raw constituents. (c) FTIR (Fourier transform infrared) spectra showing the loss of 2235 cm$^{-1}$ N═C═O isocyanate stretch and 3227 cm$^{-1}$ and 3492 cm$^{-1}$ —OH stretches belonging to PTHF and TRIOL respectively while forming the 3300 cm$^{-1}$ —NH stretch. (d) FTIR spectra showing the loss of the 1637 cm$^{-1}$ C═C stretch that constitutes the PMMA IPN component.

The following abbreviations are used in the present specification:
CAH: contact angle hysteresis as measured using an advancing-receding contact angle method
DD: dibutyltin dilaurate
IPN: interpenetrating polymer network
PMMA: polymethyl methacrylate
PTHF: polytetramethylene ether glycol (polytetrahydrofuran)
PU: polyurethane
SA: sliding angle or tilt angle
TDI: tolylene-2,4-diisocyanate
TRIOL: tris(hydroxymethyl)propane
WCA: static water contact angle as measured by the sessile drop method The following terms used herein are defined as set out below:
10 hour half-life temperature: the temperature at which the half-life of a free radical initiator is 10 hours.
Acrylic monomer: a monomer comprising a moiety of structure C=C—C=O.
IPN: Polymer comprising two or more networks that are at least partially interlaced on a molecular scale but not covalently bonded to each other and cannot be separated unless chemical bonds are broken (see IUPAC Gold Book http://goldbook.iupac.org/I03117.html).
Superhydrophilic: having a WCA of less than about 10° achieved within 0.5 s.
Superhydrophobic: having a WCA of at least 150°.
UVC: electromagnetic radiation in the frequency range 290-100 nm.

The invention described herein relates to a suspension of colloidal particles which comprise an IPN, a process for making the suspension, and films made from the suspension.

The process for making the suspension involves initially preparing a polymerisation mixture, which may be a solution and/or a dispersion. This mixture comprises monomer systems for the two interpenetrating polymers of the network. The monomer systems are capable of polymerising using different mechanisms. The resulting network may be a simultaneous IPN, i.e. the two network polymers may form at the same time, or may be a sequential IPN, i.e. a first network polymer is formed and the second network polymer subsequently forms within the first polymer. It is thought that if a free-radical inhibitor is present in the polymerisation mixture the IPN will be predominantly sequential whereas if it is absent it will be largely simultaneous.

A first monomer system is based on acrylic monomers and is polymerisable by a free-radical mechanism. This monomer system comprises a non-crosslinking monomer comprising only one carbon-carbon double bond and a crosslinking monomer comprising at least two carbon-carbon double bonds. The non-crosslinking monomer may be acrylic or methacrylic. It may be for example a (meth)acrylic ester, a (meth)acrylamide, (meth)acrylic acid or some other non-crosslinking acrylic monomer (e.g. an alkoxymethacrylic ester). The crosslinking monomer may similarly be a (meth)acrylic ester or a (meth)acrylamide. In the case of an ester, it may be an ester of a diol, a triol, a tetraol, a pentaol or some other polyol, i.e. it may be a diester, triester, tetraester or pentaester etc. In the case of an amide, it may have structure $HN((=O)C—CH=CH_2)_2$, $N((=O)C—CH=CH_2)_3$ or some other similar structure. The first monomer system includes a catalyst (free radical initiator) which is present in the polymerisation mixture. The catalyst may be an azo initiator, an azo ester initiator, a peroxide initiator, a peroxydicarbonate initiator or some other suitable initiator. Commonly it will be a thermal initiator (i.e. one that is activated by heating), however it may in some instances be a UV-activatable initiator, a redox initiator or some other suitable initiator type. In the event that it is a thermal initiator, it may have a 10 hour half-life temperature of between about 40 to about 80° C., or about 40 to 70, 40 to 60, 50 to 80, 60 to 80 or 50 to 70° C., e.g. about 40, 45, 50, 55, 60, 65, 70, 75 or 80° C. It will be recognised that the half-life of an initiator may be dependent in part on the medium in which it is measured. The above 10 hour half-life temperature may be as measured in toluene, or may be as measured in the polymerisation mixture. Suitable initiators include azobis(isobutyronitrile) (AIBN), 4,4-azobis(4-cyanovaleric acid), benzoyl peroxide, lauroyl peroxide and potassium persulfate.

The polymerisation mixture (optionally the first monomer system) may also comprise a radical scavenger or radical polymerisation inhibitor. This may for example be a quinone type inhibitor such as MEHQ (hydroquinone monomethyl ether). The inhibitor may be supplied with the non-crosslinking monomer or with the crosslinking monomer or with both. It may be present in sufficiently low concentration that during the free radical polymerisation process it is entirely consumed by the free radical initiator. It may be present in the polymerisation mixture at a mole ratio to the free radical initiator of less than about 20%, or less than about 10 or 5%, e.g. at about 1, 2, 3, 4, 5, 10, 15 or 20 mol %.

In the first polymerisation system, the ratio of non-crosslinking monomer to crosslinking monomer on a mole basis of polymerisable groups may be from about 10 to about 50 (i.e. about 10:1 to about 50:1, or about 10 to 40, 10 to 30, 10 to 20, 20 to 50, 30 to 50 or 15 to 30, e.g. about 10, 11, 12, 13, 14, 15, 16, 17, 18, 19, 20, 25, 30, 35, 40, 45 or 50. In this context, for example, if the ratio of a non-crosslinking monomer to crosslinking monomer on a mole basis were 2 (i.e. 2:1) and the crosslinking monomer had two polymerisable olefinic groups per molecule (e.g. if it were a dimethacrylate), then the ratio of non-crosslinking monomer to crosslinking monomer on a mole basis of polymerisable groups would be 1:1. The free radical initiator may be present at a mole ratio of about 2% relative to the total of non-crosslinking and crosslinking monomer. It may be present at about 0.5 to about 5%, or about 1 to 5, 2 to 5, 0.5 to 2, 0.5 to 1 or 1 to 3%, e.g. about 0.5, 1, 1.5, 2, 2.5, 3, 3.5, 4, 4.5 or 5%.

A second polymerisation system is based on urethane chemistry, i.e. it contains a diol, a polyol and an isocyanate having at least two isocyanate groups per molecule. The isocyanate may for example be TDI (toluene diisocyanate, e.g. 2,4 or 2,6 or a mixture thereof), MDI (methylene diphenyldiisocyanate), IPDI (isophorone diisocyanate), HDI (hexamethylene diisocyanate), HMDI (hydrogenated MDI: methylene bis(4-cyclohexylisocyanate)), naphthalene diisocyanate, triphenylmethane-4,4',4''-triyl triisocyanate or some other diisocyanate or triisocyanate. It may be an aromatic isocyanate or may be an aliphatic diisocyanate. In some instances the isocyanate may have more than 2 isocyanate groups per molecule, e.g. 3, 4 or 5. The diol may be any suitable compound having two hydroxyl groups joined by an organic moiety. It may be an alkane diol (i.e. the organic moiety may be an alkanediyl group, which may be straight chain, branched, cyclic or may have two or all of these structures), for example an alkane $\alpha,\omega$-diol in which the alkane is a straight chain alkane (i.e. it may be $HO(CH_2)_nOH$), in which case n may be from 2 to 12, or 2 to 10, 2 to 6, 3 to 8 or 4 to 6, e.g. 2, 3, 4, 5, 6, 7, 8, 9, 10, 11 or 12, optionally greater than 12), or it may be a polyether polyether diol (e.g. $HO(CH_2CH_2O)_nH$ or $HO(CH(CH_3)CH_2O)_nH$, in which case n may be from 1 to about 50, or about 1 to 20, a to 10, 1 to 5, 5 to 50, 10 to 50, 20 to 50, 5 to 20, 5 to 10 or 10 to 20, e.g. 1, 2, 3, 4, 5, 6, 7, 8, 9, 10, 15, 20, 25, 30, 35, 40, 45 or 50, optionally greater than 50) or it may be some other type of diol. The diol may have a molecular weight of between about 500 and about 5000, or 1000 to 5000, 2000 to 5000, 500 to 2000, 500 to 1000 or 1000 to 2000, e.g. about 500, 1000, 1500, 2000, 2500, 3000, 3500, 4000, 4500 or 5000. It may have no other functional group other than OH. It may have no amine groups. It may have no carboxyl groups. It may have no carbon-carbon unsaturation (i.e. no double bonds or triple bonds). It may have no groups that would be polymerisable using free radical initiation. The polyol is any suitable compound containing more than two hydroxyl groups per molecule. It may have 3, 4, 5, 6, 10, 15, 20 or more than 20 hydroxyl groups per molecule. It may be a monomeric polyol or it may be oligomeric. It may be for example a saccharide, tris(hydroxymethyl)propane, tris(hydroxymethyl)ethane, pentaerythritol, erythritol or some other type of polyol. It may be an aliphatic polyol. It may have no carbon-carbon unsaturation (i.e. no double bonds or triple bonds). It may have no groups that would be polymerisable using free radical initiation. It may have no other functional group other than OH. It may have no amine groups. It may have no carboxyl groups. It may be monomeric.

The ratio of polyol to diol in the second polymerisation system may be about 3 to about 10 (i.e. 3:1 to 10:1), or about 5 to 10 or 3 to 7, e.g. about 3, 4, 5, 6, 7, 8, 9 or 10 on a mole OH basis. However since the polyol commonly has lower molecular weight than the diol (since the latter may be oligomeric), the weight ratio of polyol to diol may be about 0.1 to about 0.5, or about 0.2 to 0.5, 0.3 to 0.5, 0.1 to 0.4, 0.1 to 0.3 or 0.2 to 0.4, e.g. about 0.1, 0.2, 0.3, 0.4 or 0.5. The mole ratio of isocyanate to hydroxyl (on a functional group basis) may be about 1, and may be between about 0.7 to about 1.3, or about 0.7 to 1, 1 to 1.3, 0.8 to 1, 1 to 1.2, 0.9 to 1, 1 to 1.1 or 0.8 to 1.2, e.g. about 0.7, 0.8, 0.9, 1, 1.1, 1.2 or 1.3. In some embodiments, isocyanate is present in molar excess over hydroxyl. It may be present in a molar excess of about 1 to about 20%, or about 1 to 10, 1 to 5, 5 to 20, 10 to 20 or 5 to 10%, e.g. about 1, 2, 3, 4, 5, 6, 7, 8, 9, 10, 15 or 20%. The polyurethane catalyst may be added at a concentration of about 100 to about 500 ppm on a w/v (i.e.

mg/L) or volume (i.e. micrograms per litre) basis relative to the remaining portions of the polymerisable mixture, or about 100 to 300, 300 to 500 or 200 to 400 ppm, e.g. about 100, 150, 200, 250, 350, 400, 450 or 500 ppm.

The components of the first and second polymerisation systems described above are combined in a solvent. This may involve simply adding each of the components of the two systems to a solvent. In this instance, the solvent may be a solvent which dissolves all of these components. Suitable solvents are organic liquids and mixtures, preferably homogeneous mixtures, thereof. Thus when mixtures are used, the two or more liquids should be miscible in the proportion in which they are used. Suitable solvents include toluene, acetone, diethyl ether, 1,4-dioxane, benzene, ethyl acetate, glyme, diglyme and mixtures. In one embodiment, the first polymerisation system is prepared in a first solvent and the second polymerisation system is prepared in a second solvent (which may be the same as the first solvent or may be different, but should be miscible therewith) and the two resulting solutions are combined to form the polymerisation mixture. Other addition processes to produce the polymerisation mixture will be readily apparent.

The polymerisation mixture, as well as, independently, the solutions of the first and second polymerisation systems in the event that these are prepared and mixed to form the polymerisation mixture, may have a solids content of from about 5 to about 25% w/v, or from about 5 to 20, 5 to 15, 10 to 20 or 7 to 15%, e.g. about 5, 6, 7, 8, 9, 10, 12, 14, 16, 18, 20, 22, 24 or 25%. In this context, "solids content" refers to the weight of all materials other than the solvent in 100 ml of solution. Thus "solids" may in fact not be in solid form.

Once the polymerisation mixture has been prepared, a catalyst for polyurethane polymerisation is added. Suitable catalysts include metal based catalysts, e.g. catalysts based on tin, bismuth, zirconium, aluminium or mixtures of any two or more of these. The catalyst may be a carboxylate, e.g. a laurate, stearate, an acetate or some other carboxylate. The metal may also be bonded to one or more (commonly two) alkyl groups e.g. a C1 to C6 alkyl group. Suitable catalysts therefore include dibutyltin dilaurate and dibutyltin diacetate. Other catalysts include tertiary amine catalysts such as 1,4-Diazabicyclo[2.2.2]octane (Dabco), diazabicyclononane (DBN), diazabicycloundecane (DBU), 2,2'-bis(dimethylamino)diethylether, benzyldimethylamine, N,N-dimethylcyclohexylamine etc. The resulting catalysed reaction mixture is then heated for a suitable time at a suitable temperature for polymerisation of both polymerisation systems. The temperature will depend on the precise nature of the components of the two systems. Typically, the temperature will be within about 10° C. of the 10-hour half-life temperature of the free radical initiator. It may be from about 30 to about 90° C., or about 30 to 70, 30 to 50, 50 to 90, 70 to 90 or 50 to 70° C., e.g. about 30, 35, 40, 45, 50, 55, 60, 65, 70, 75, 80, 85 or 90° C., but in some instances may be greater than 90 or less than 30° C. The time will commonly be between about 50% and about 200% of the half-life of the initiator or about 50 to 100, 100 to 150 or 150 to 200% thereof, e.g. about 50, 60, 70, 80, 90, 100, 110, 120, 130, 140, 150, 160, 170, 180, 190 or 200% of the half-life of the initiator. It may be between about 5 and about 20 hours, or about 5 to 10, 10 to 15 or 15 to 20 hours, e.g. about 5, 6, 7, 8, 9, 10, 11, 12, 13, 14, 15, 16, 17, 18, 19 or 20 hours. In some instances, the polymerisation temperature is greater than the ambient pressure boiling point of the solvent, or of one of the solvents. It may be beneficial to conduct the polymerisation under increased pressure and/or in a sealed container (optionally a sealed pressure vessel). In some instances the polymerisation mixture may be degassed before polymerisation is initiated, so as to remove oxygen. This may be achieved by sparging, e.g. with nitrogen, helium or some other non-oxygen containing gas, or may be achieved by successive freeze-thaw cycles (e.g. 2, 3 or 4 such cycles) or by any other suitable method. In some instance the reaction may be conducted in the dark, i.e. with exclusion of visible light and/or with exclusion of UV radiation, optionally with exclusion of all electromagnetic radiation.

Following polymerisation to form an interpenetrating polymer network, the network is in the form of a dispersion of network particles in the solvent. It may be a colloidal dispersion. The particles of the dispersion may have a mean particle diameter of from about 200 to about 1000 nm, or from about 200 to 500, 500 to 1000 or 300 to 700 nm, e.g. about 200, 250, 300, 350, 400, 450, 500, 550, 600, 650, 700, 750, 800, 850, 900, 950 or 1000 nm. In some cases, it may be smaller, e.g. down to about 10 nm. It may be for example about 10 to about 200 nm, or about 10 to 100, 10 to 50, 20 to 200, 50 to 200, 100 to 200, 20 to 50 or 50 to 100 nm, e.g. about 20, 30, 40, 50, 60, 70, 80, 90, 100, 150 or 200 nm. The particles may be monodispersed or may be polydispersed. They may have a broad or a narrow particle size distribution. The ratio of weight average to number average particle diameters may be between about 1 and about 10 or greater, or about 1 to 5, 1 to 2, 2 to 10, 5 to 10 or 2 to 5, e.g. about 1, 1.5, 2, 2.5, 3, 3.5, 4, 4.5, 5, 6, 7, 8, 9 or 10. It will therefore be understood that the dispersion contains a cured interpenetrating polymer network in the form of colloidal particles dispersed in a solvent. When this is applied to a surface, the solvent can evaporate, leaving a surface having microroughness due to the colloidal particles.

The dispersion may be a sprayable dispersion. It may have a viscosity less than about 1000 cP, or less than about 500, 200, 100 or 50 cP.

The dispersion may be applied to a surface so as to form a coating of the interpenetrating polymer network on the surface. The applying may comprise spraying, wiping, rolling, spin-coating, dip-coating, drop-casting, electrospinning, or some other suitable method. The process may further comprise allowing the coating to dry to form a dried coating on the surface. The time for drying will depend in part on the vapour pressure of the solvent and in part on the temperature of the drying. The drying may be conducted at any suitable temperature. It will commonly be conducted at ambient temperature, e.g. between about 20 and 25° C., but may be conducted at elevated temperature, e.g. about 25 to about 60° C., or about 25 to 50, 25 to 35 or 35 to 60° C. It may for example be conducted at about 20, 25, 30, 35, 40, 45, 50, 55 or 60° C. Suitable conditions are 20-25 C. 40-60% relative humidity. The surface may be any suitable surface. It may be a metallic surface, a polymeric surface, a wooden surface, a glass surface, a ceramic surface, a synthetic surface or some other surface. The resulting dried film may function as a protective coating. It may function as a base coat for further coating layers.

In one embodiment, after partial drying of the coating, a particulate material is applied to the coating. Commonly the particulate material will be applied as a suspension. It may for example be sprayed onto the coating. The suspension may be in a volatile solvent. It may be in any of the solvents or any mixture there of listed above in respect of preparing the polymerisable mixture. The concentration of the particulate material in the suspension may be about 1 to about 10% w/v, or about 1 to 5, 1 to 2, 2 to 10, 5 to 10 or 2 to 5%, e.g. about 1, 2, 3, 4, 5, 6, 7, 8, 9 or 10%. It is thought that the hydrophobic particles provide nanoroughness to the surface of the film, which, in combination with the microroughness due to the colloidal particles, provides superhydrophobicity.

The particulate material may be a particulate solid. It may have a mean particle size of about 2 to about 20 nm, or about 2 to 10, 2 to 5, 5 to 20, 10 to 20 or 5 to 10 nm, e.g. about 2, 3, 4, 5, 6, 7, 8, 9, 10, 11, 12, 13, 14, 15, 16, 17, 18, 19 or 20 nm. It may be an inorganic particulate solid. Particles of the particulate solid may have organic regions and inorganic regions. The particulate solid may be hydrophobic. It may be a ceramic. It may be titania. It may be iron oxide. It may be a hydrophobic ceramic, e.g. hydrophobic silica. It may be a silica having grafted organic groups on the surface of the particles thereof. It may be a fumed silica, e.g. a hydrophobic fumed silica. Mixtures of any two or more of these particles may also be used. It may be a fumed silica having hydrophobic groups on the surface. The hydrophobic groups may be alkyl groups, e.g. C1 to C18 straight chain or branched alkyl groups, such as methyl, ethyl, n-propyl, i-propyl, n-butyl, t-butyl, hexyl, octyl, isooctyl, decyl, dodecyl, tetradecyl or hexadecyl. They may be fluoroalkyl groups, e.g. perfluoalkyl groups. They may be fluorinated or perfluorinated or partially perfluorinated forms of any of the alkyl groups described above. Any two or more of the above hydrophobic groups may be present. For example, the fumed silica may have fluoroalkyldialkylsilyloxy groups on the surface. The alkyl groups may be any of the alkyl groups described above, and the fluoroalkyl group may be any of the fluoroalkyl groups described above. For example the particulate solid may comprise fumed silica having 1H,1H,2H,2H-perfluorooctyldimethylsiloxy groups on the surface thereof. It should be noted that "1H,1H,2H,2H-perfluorooctyl" refers to $F_3C(CF_2)_5(CH_2)_2-$. The organic groups may be present on substantially the entire surface of the particles. The hydrophobic particulate solid, when applied to the film, may be partially wetted by the polymer mixture or it may be completely wetted by the polymer mixture. The particles of the particulate solid may be wetted over a part of their surface. The particulate solid may be wetted before curing and/or drying of the polymers such that, when cured, the hydrophobic solid is at least partially embedded in the surface of the film. The embedded particles may be abrasion resistant. The embedded particles may be partially embedded in the surface of the film and partially exposed to the surrounding environment or they may be fully embedded in the surface of the film.

Alternatively the particulate solid applied to the film may be hydrophilic. It may be a hydrophilic ceramic. It may be for example a hydrophilic silica, e.g. colloidal silica or fumed silica, or it may be a hydrophilic (e.g. colloidal) titania, alumina, zirconia or other suitable hydrophilic solid. Following complete drying, the resulting film may be superhydrophilic. It may have a WCA of less than about 10°, or less than 9, 8, 7, 6, 5, 4, 3, 2 or 1°. It may have a WCA of about 1, 2, 3, 4, 5, 6, 7, 8, 9 or 10°, or may have a substantially zero contact angle. It may achieve this within about 0.5 s, or within about 0.4, 0.3, 0.2 or 0.1 s of application of the droplet to the surface of the film. In the superhydrophilic film, the hydrophilic particles may be wetted by the polymer of the film. It is thought that this might occur by virtue of the particles being applied in a suspension of an organic solvent. Thus as a droplet of solvent containing one or more hydrophilic particles impacts on the surface of the film, which contains residual water, the solvent can blend with the film, possibly by blending with the water, and thereby lead to wetting of the hydrophilic particles by the film.

Once a hydrophilic solid has been added to the film, it may be subsequently hydrophobed. This may be achieved by exposing the film, and/or the hydrophilic particles, to a hydrophobing agent. The same range of hydrophobing agents as is described elsewhere herein may be used. This may result in a superhydrophobic film as described elsewhere herein.

The suspension of the particulate material and the dispersion of network particles may each be stable. They may, independently, be stable for at least about 1 week or at least about 2, 3, 4, 5, 10, 15, 20, 25, 30, 35, 40, 45 or 50 weeks. In this context, the term "stable" indicates that after the stated period, the concentration of particles in the top half of the dispersion differs from the concentration of particles in the bottom half of the dispersion by less than about 10%, or less than about 8, 6, 4, 2 or 1%, when the dispersion is stored without agitation.

The particulate solid may be applied to the coating after a delay time (following application of the coating to the surface) of from 10 to about 100 minutes, or about 10 to 50, 10 to 20, 20 to 100, 50 to 100, 10 to 40, 10 to 30 or 20 to 40 minutes, e.g. about 10, 15, 20, 25, 30, 35, 40, 45, 50, 55, 60, 65, 70, 75, 80, 85, 90, 95 or 100 minutes. The time should be sufficient for partial drying but preferably insufficient for complete drying of the coating. Following application of the particulate solid, the resulting composite solid may be allowed to dry completely. In this context "completely" indicates a residual solvent content of less than about 5% by weight, or less than about 4, 3, 2 or 1% by weight.

The resulting composite film may therefore comprise an interpenetrating polymer network, and may have a surface layer comprising the particulate solid. In this context, the "surface layer" may be the top 20% of the film, or the top 10%, or the top 5% or the top 2%. The surface layer may comprise both the interpenetrating polymer network and the particulate solid. It may comprise the particulate solid at least partially embedded in the interpenetrating polymer network. The composite network may be hydrophobic. It may be superhydrophobic. It may be a lotus effect surface. It may exhibit Cassie-Baxter wetting characteristics. It may have a WCA of at least about 150°, or at least about 155, 160 or 165°, e.g. about 150, 155, 160, 165 or 170° C. It may have a sliding angle of less than about 20°, or less than about 15, 10 or 5°, e.g. about 5, 10, 15 or 20°. It may be capable of maintaining these values after abrasion. It may be capable of maintaining these characteristics after at least 50 abrasion cycles, or after at least 60, 70, 80, 90, 100, 150 or 200 abrasion cycles. These may be as defined in ASTM D4060-14. It may be capable of maintaining these characteristics after at least 1000 minutes of UV exposure at 354 nm and 3.3 mW/cm$^2$, or at least about 1500, 2000, 2500 or 3000 minutes. It may be capable of maintaining these characteristics after at least 6 hours of immersion in a strong mineral acid, or at least 12, 18 or 24 hours. It may be capable of maintaining these characteristics after at least 6 hours of immersion in oil, or at least 12, 18 or 24 hours. The film may be substantially transparent to visible light at a thickness of up to 1 mm. It may have transmittance at 600 nm of at least about 50%, or at least about 55, 65 or 70%. The film may have a thickness of from about 10 to about 50 microns (micrometres), or about 10 to 30, 20 to 50, 20 to 30 or 20 to 40 microns, e.g. about 10, 15, 20, 25, 30, 35, 40, 45 or 50 microns.

The superhydrophobic films of the present invention may be used in any application in which superhydrophobicity is a benefit and/or where abrasion resistance and/or durability is a benefit. For example they may be used to reduce drag coefficient in water craft, or to reduce marine fouling, or to reduce corrosion of bodies, especially metallic bodies, immersed in water. They may also be used as coatings on electronics, solar panels, on glass surfaces to reduce droplet adhesion (e.g. for windscreens), in medical equipment, for rendering surfaces self-cleaning and in other applications. The superhydrophilic films of the invention may be used in any application in which superhydrophilicity is a benefit and/or where abrasion resistance and/or durability is a benefit. For example they may be used in antifogging screens, windows and lenses, anti-fouling coatings, microfluidic devices, biocompatible implant devices, coatings for enhanced boiling heat transfer, foils for food packaging etc. Additionally, the films of the invention, whether superhydrophilic, superhydrophobic or otherwise, form a useful protective coating to substrates to provide improved resistance to abrasion and to chemical insults.

In a particular embodiment, the invention relates to a stable PU-PMMA colloidal IPN system that self-assembles during spray deposition into a hierarchically structured ultra-robust coating. This IPN coating serves as a platform for superhydrophobic nanostructures enabling preservation of a highly dewetting Cassie-Baxter state through mechanical-, chemical- and photo-induced stresses. These superhydrophobic coatings preserved a pristine lotus-dewetting surface (WCA>150°, SA<10°) after 250 rotary abrasion cycles, finger-wipe resilience, extended immersion in concentrated acids and oil contamination as well as extended high intensity UVC exposure. Furthermore, the composite interfaces possess excellent optical properties with 14.8% net transmittance losses. The findings provide an easily applicable PU-PMMA IPN platform with superior mechanical and chemical properties for the synthesis of highly durable and transparent self-cleaning coatings, an enabling step for many real-world applications.

Described herein is a method for the fabrication of ultra-durable sprayable superhydrophobic coatings, based on micro-nano texturing of hybrid interpenetrated polymer networks (IPNs). A sprayable polyurethane-acrylic colloid is developed that enables rapid self-assembly of complex surface structures, comprising soft yielding marshmallow-like pillars textured by sub-micron craters. The spray-developed IPN possessed excellent optical properties with less than 5% light transmission losses. Coupled with a superhydrophobic nanoparticulate layer, the composite IPN demonstrated outstanding anti-abrasion resistance, preserving superhydrophobic water contact angles and pristine lotus effect with sliding angle below 10° for up to 120 continuous standard abrasion cycles (ASTM D4060). The composite IPN was also chemical- and photo-stable, with excellent preservation of superhydrophobic dewetting properties upon exposure to 50 h of intense UVC light (254 nm, 3.3 mW·cm$^{-2}$), 24 h of oil contamination and highly acidic conditions (1M HCl). These findings provide a set of syntheses and structural parameters for the engineering of highly performing durable superhydrophobic coatings with superior abrasion, chemical and UV-resistance.

Examples

Discussion

Solvent-Borne Synthesis of Sprayable Interpenetrated Poly-Urethane-Acrylic Networks The synthesis of the sprayable IPN hierarchical textures is illustrated in FIG. 1a. The IPN solution was prepared in 2 parts, with an acrylic-based (PMMA) component in acetone and a polyurethane-based (PU) component in xylene. Upon mixing both parts, the simultaneous cross-linking of PMMA and PU components results in a colloidal suspension of PU-PMMA that readily self-assembles into hierarchically structured IPN during spray-deposition. The cross-linking of the acrylic component is thought to form dispersed constituents within the much more rapidly developed polyurethane networks, stabilizing the continuous PU phase, which eventually enables a toughened interface through interlaced networks. Spectroscopic analysis of the spray-developed coatings (FIG. 1b-d) indicates complete polymerization of both the PU and PMMA components. Complete PU reaction is confirmed by the loss of the 2235 cm$^{-1}$ N=C=O isocyanate stretch band (FIG. 1c) and 3227 cm$^{-1}$ and 3492 cm$^{-1}$ —OH stretch bands belonging to polytetramethylene ether glycol (PTHF) and tris(hydroxymethyl)propane (TRIOL), respectively, and by the formation of the 3300 cm$^{-1}$ —NH stretch band (FIG. 1b). Complete PMMA reaction is revealed by a loss of the 1637 cm$^{-1}$ C=C stretch band, which is the main chemical signature of methyl methacrylate (MMA) and its crosslinker (FIG. 1d).

Thermomechanical Analysis of Interpenetrated Networks

Figure 2:
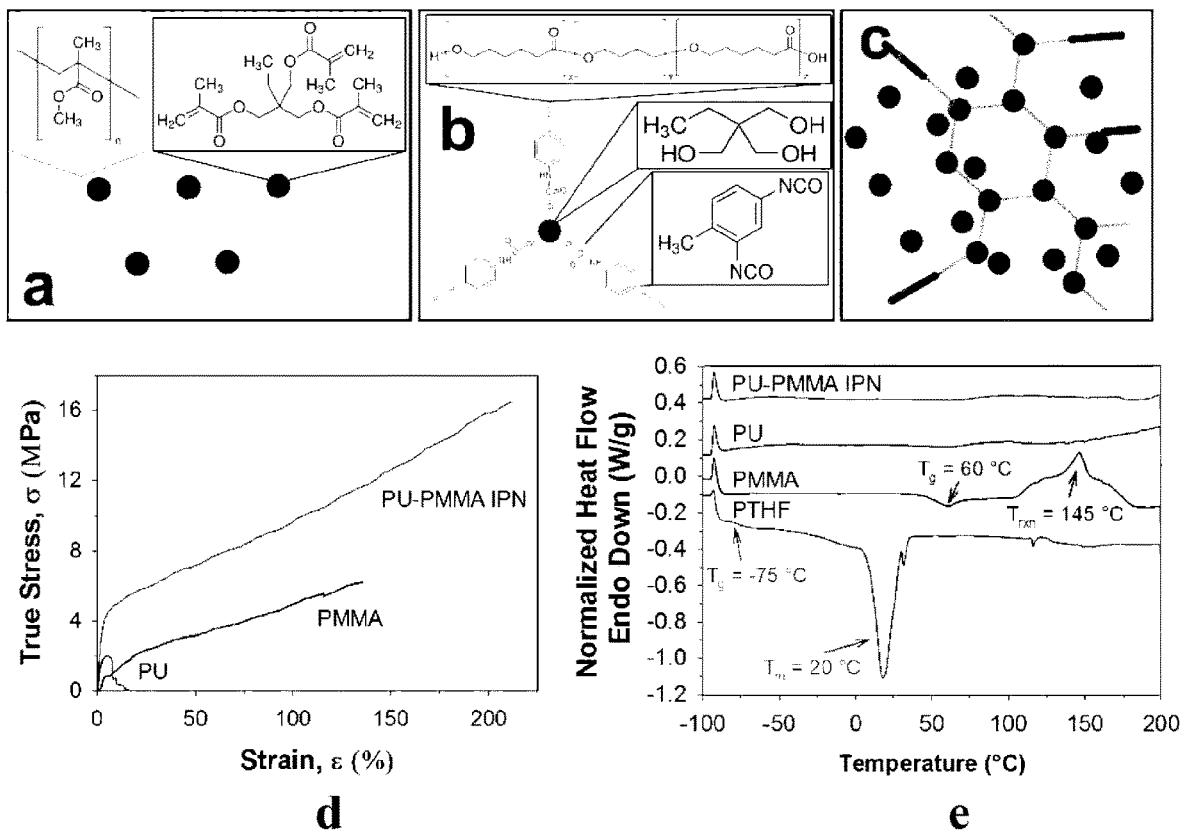
FIG. 2: Schematic of (a) crosslinked PMMA, (b) crosslinked PU and (c) PU-PMMA IPN. (d) Tensile stress-strain tests on as-sprayed PU, PU-PMMA and liquid cast PMMA coatings. (e) Differential scanning calorimetric analysis of crosslinked PU, PMMA and PU-PMMA IPNs.
Figure 3:
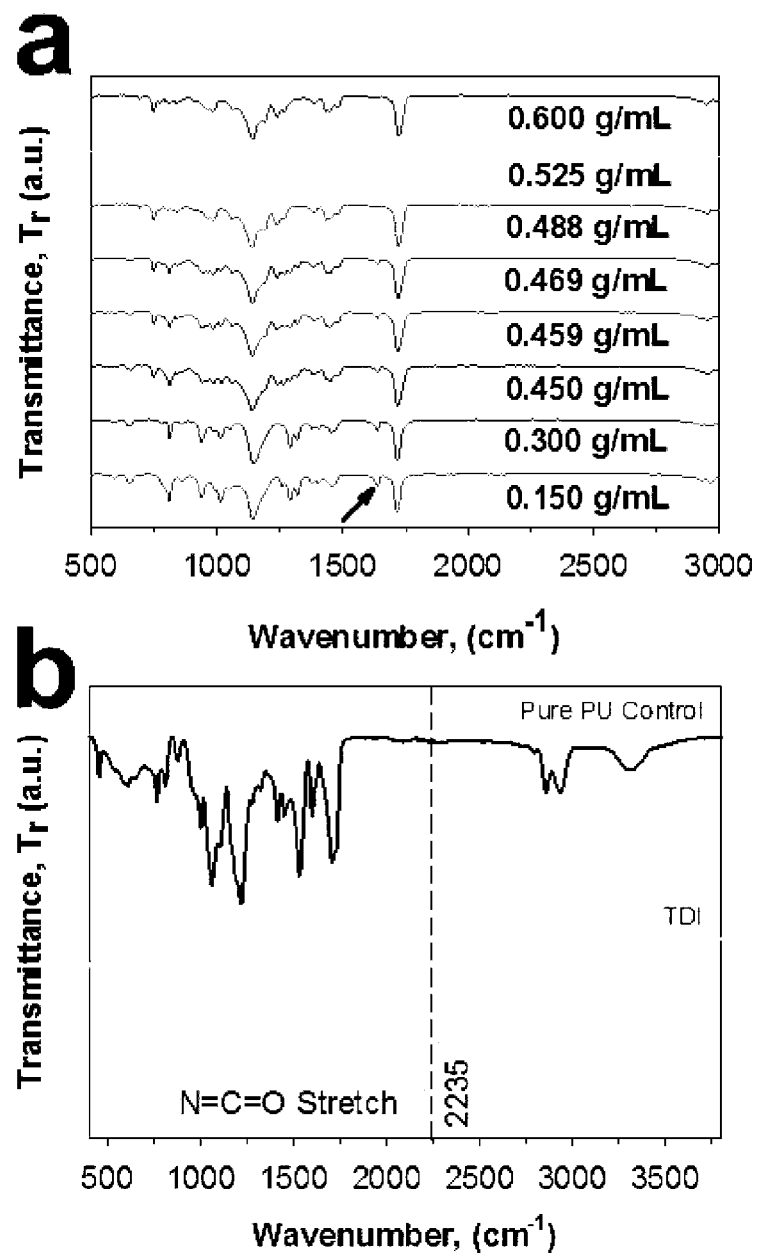
FIG. 3: Development of optimal controls—cross-linked PU and PMMA. (a) Spectroscopic analysis of PMMA samples at various polymer to solvent ratios, indicating a preferred ratio of 0.450 g/mL, which revealed only partial reaction of C═C 1637 cm$^{-1}$ stretch, while preserving sprayability (b) Spectroscopic analysis of PU samples at various polymer to solvent ratios showing a preferred polymer to solvent ratio of 0.075 g/mL, which revealed complete reaction of the isocyanate group at 2235 cm$^{-1}$ and 3227 cm$^{-1}$ and 3492 cm$^{-1}$ —OH stretches belonging to PTHF and TRIOL respectively while forming the 3300 cm$^{-1}$ —NH stretch, indicating complete formation of the cross-linked polymer.

Homopolymeric PU and PMMA were also developed as cross-linking (FIGS. 2a, b) sprayable control samples (FIG. 3). It is notable that purely cross-linked PMMA developed in this solvent system (xylene: acetone), were not sprayable (0.488-0.600 polymer to solvent ratios). Mechanical behavior of the as-sprayed IPNs (FIGS. 2c, d) and the controls coatings were observed and measured by stress-strain analysis using a tensile tester (Instron 4505, U.S.A). The spray-casted control PMMA samples were hard to manipulate upon due to their brittle nature, and thus were liquid-cast (FIG. 2d). A direct comparison between the IPN and the control samples revealed much enhanced stiffness in the former (FIG. 2d). This is shown by a two-fold increase in the Young's modulus, from 86.9 MPa of the PU to 192 MPa of the IPN. The maximum tensile strength was increased by nearly 11 times, from 1.5 MPa of the PU to 16 MPa of the IPN. Despite the significantly higher stiffness, the IPN was also significantly toughened and able to absorb much more energy up until fracture. The IPN showed an increase of approximately 32 times in elongation at break, from 5.5% of the PU to 179-210% of the best IPN samples. This sprayable IPN exceeds the properties of commercially available elastomers, for example, polydimethylsiloxane (PDMS), Sylgard® 184.

Figure 4:
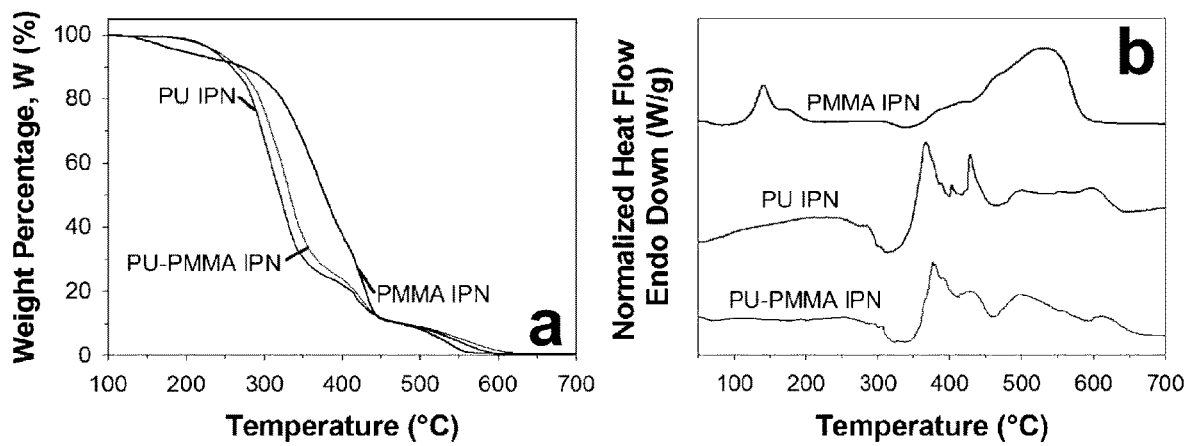
FIG. 4: High temperature thermogravimetric-differential scanning calorimetric (TG-DSC) analysis of cross-linked PU, PMMA and PU-PMMA IPNs. High temperature differential scanning calorimetry (DSC) analysis was conducted using the STA 8000 (Perkin Elmer, U.S.A) using alumina pans, from 50 to 900° C. at 10° C. min$^{-1}$ ramp under nitrogen.

Thermal analysis of the samples by differential scanning calorimetry (DSC) supported the finding of a well-formed interpenetrated network in the PU-PMMA IPN system. Notably, heat flow characteristics such as melting temperature ($T_m$), glass transition ($T_g$) and thermal curing ($T_{rxn}$) were completely eliminated (FIG. 2e). The mobility of the pendant soft segment, PTHF (FIG. 2e), indicated by the $T_g$ of −75° C. and a $T_m$ of 145° C. disappeared in the cross-linked PU and the IPN. The crosslinked pure PMMA showed a $T_g$ of 60° C. and a final curing reaction $T_{rxn}$ at 145° C. However, upon integration of the acrylic components into the simultaneously curing PU-PMMA, these key thermal characteristics were suppressed and a nearly perfect constant heat flow was observed from −100° C. up to 250° C. for the IPN (FIG. 2e and FIG. 4b). The disappearance of characteristic heat flow properties from the former components is indicative of mobility-restriction and a well-integrated IPN with ideally entangled networks. These findings were further confirmed by the high temperature thermogravimetric-DSC (TG-DSC) analysis of crosslinked controls and IPN samples from 50° C. to 900° C. (FIG. 4a-b). Beyond 200° C., decomposition at 50% weight losses, $T_{50}$, were also noted at 320° C. (PU), 333° C. (PU-PMMA) and 378° C. (PMMA), respectively, with the IPN showing combined properties of crosslinked samples. These thermal properties are in support of the well-integrated IPNs. Further confirmation of successful IPN synthesis was conducted via immersion of thin (23 μm) strips of material in parent solvents (acetone, xylene) as well as harsher solvents (chloroform, tetrahydrofuran), all of which were insoluble over a period of 24 hours. Thin coated coatings were notably not soluble in parent solvents (acetone, xylene) while being swelled significantly in much stronger solvents (THF and chloroform).

Ultra-Hydrophobic Hierarchical Interfaces

Figure 5:
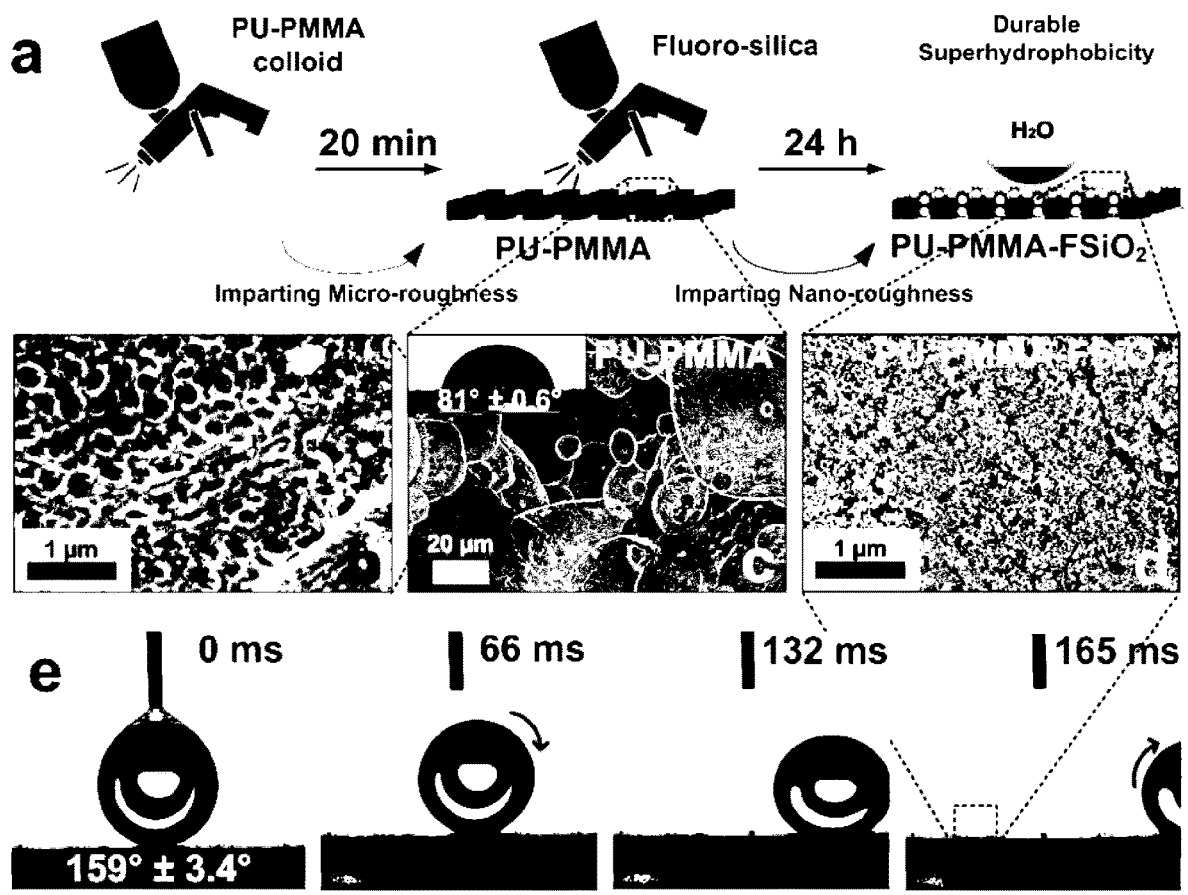
FIG. 5: (a) diagram showing sequential deposition of micro- and nano-roughness onto substrates, conferring a tough, rubbery and mechanically durable superhydrophobic interface through self-assembled micro-structures. PU-PMMA interpenetrated polymer network (IPN) with micro and sub-micro structures, shown in (b) and (c) respectively. (d) As deposited F—SiO$_2$ nanostructures. (e) Ultrahydrophobicity demonstrated by a near 0° sliding angle.
Figure 6:
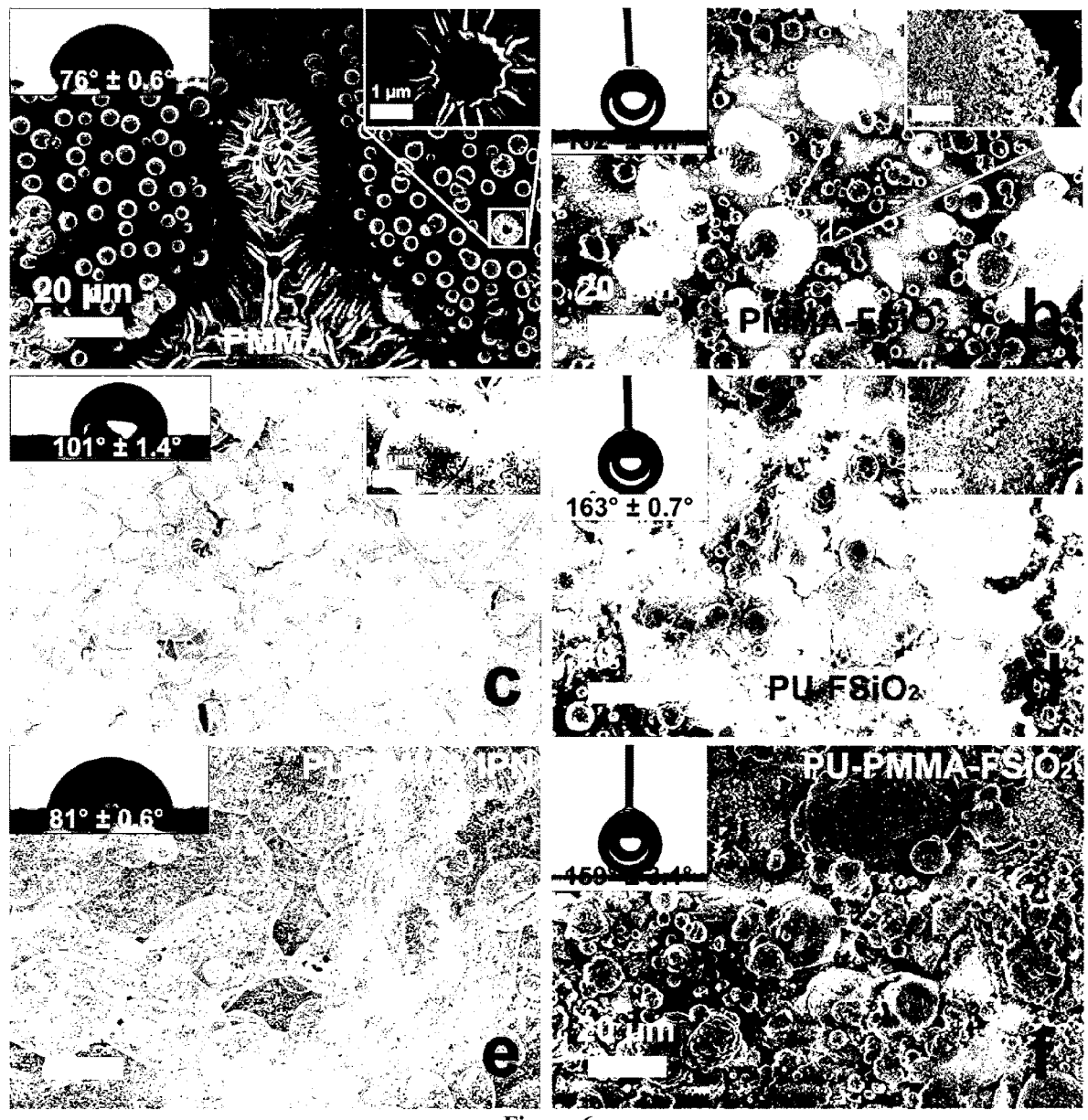
FIG. 6: SEM analysis of crosslinked (a) PMMA, (c) PU and (e) PU-PMMA IPNs without F—SiO$_2$ coating and (b,d,e) with F—SiO$_2$ coating, respectively.

The PU-PMMA IPN's microroughness ($R_q$) (FIG. 5a-c) was higher (FIG. 6) than that of the spray deposited homopolymeric PU and PMMA controls (FIG. 6). White light interferometry (WLI, 200×) revealed that the crosslinked PMMA and PU had a root-mean-square (rms) roughness ($R_q$) of 238±47 nm and 2467±102 nm, respectively. The PU-PMMA IPN showed increased rms roughness of 3048±398 nm. Despite its lower $R_q$, the crosslinked PU had a similar microscale hierarchy to the PU-PMMA IPN (FIG. 6), indicating its dominance as the hybrid's continuous phase of the IPN. The main difference was the presence of surface sub-micro defects in the cross-linked PU (FIG. 6). Furthermore, high magnification SEM images (FIG. 5b) revealed the presence of extensive sub-micro craters (diameter of 421±99 nm) on the hierarchical PU-PMMA IPN's surface. Surface energy analysis (FIG. 5c inset and FIG. 6 insets) through contact angle measurements indicate the co-existence of PMMA (WCA=76±0.6°) and PU (WCA=101±1.4°) on the as-developed IPN's interface (WCA=81±0.6°).

Figure 7:
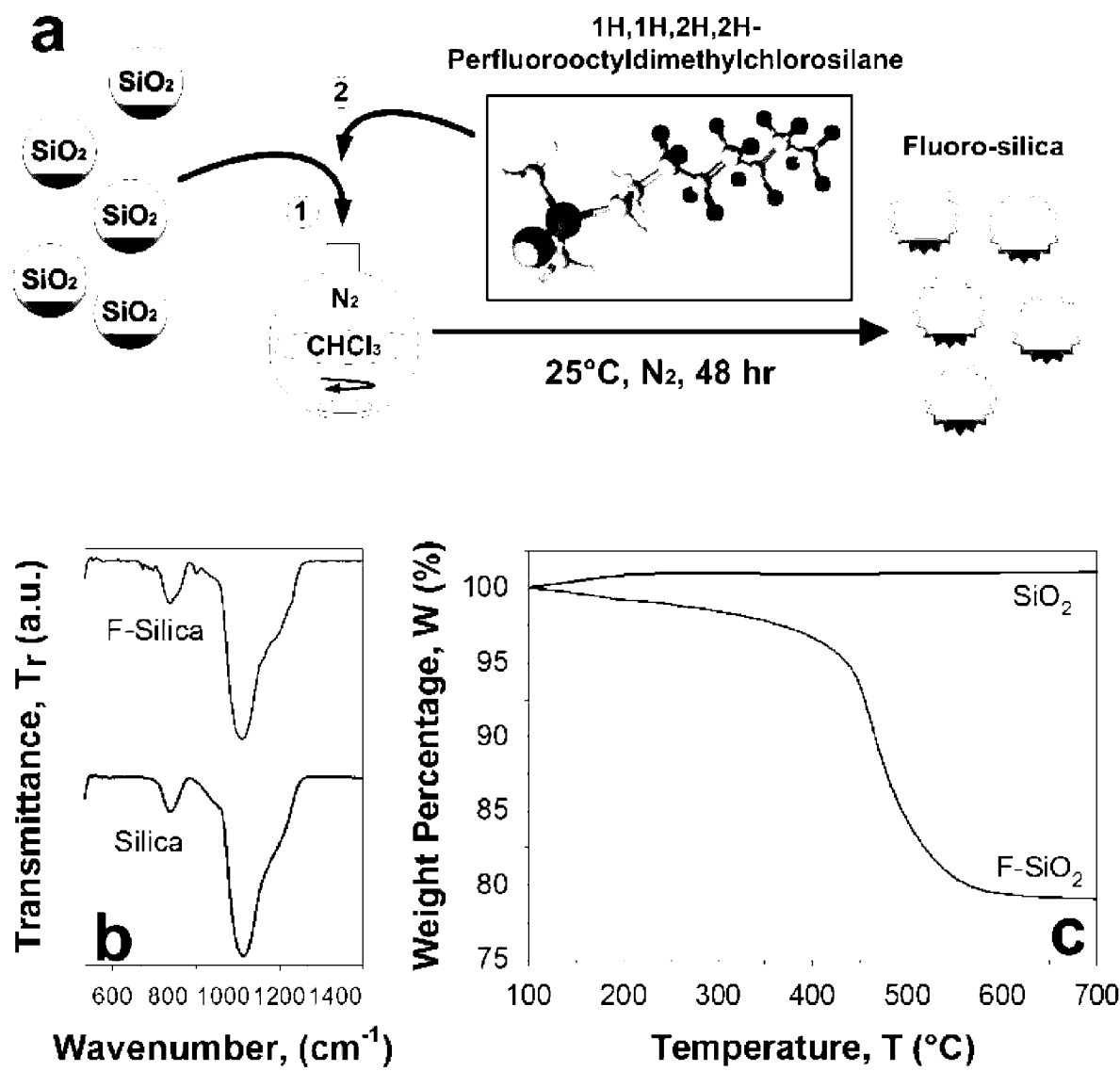
FIG. 7: (a) Diagram showing functionalization of silica with 1H,1H,2H,2H-perfluorooctyldimethylchlorosilane to produce fluoro-silica, with (b) additional organic signatures as highlighted by FTIR. Functionalization was further confirmed by (c) thermogravimetric analysis of the functionalized vs. control silica, measured at 10° C./min under nitrogen.
Figure 8:
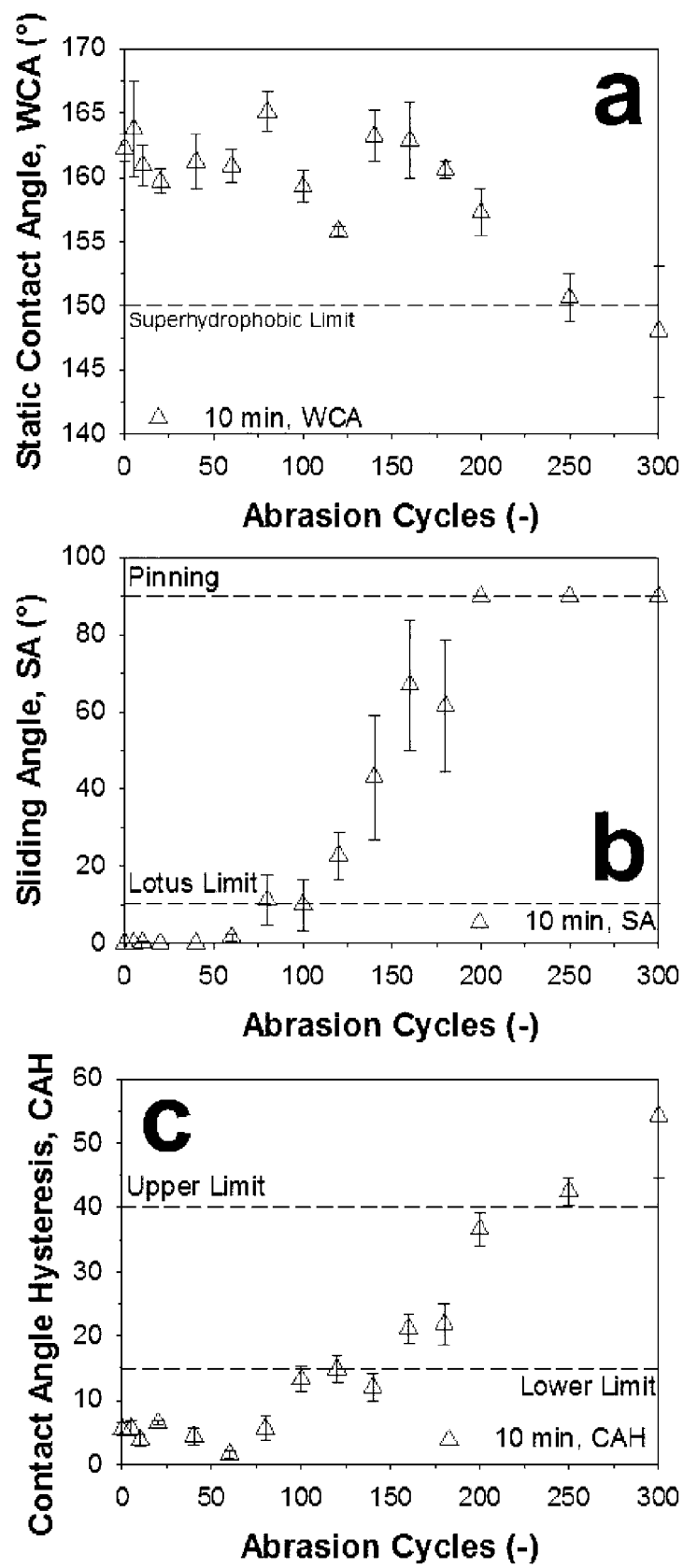
FIG. 8: graphs demonstrating time-optimized abrasion-wetting characterizations. (a) WCAs, (b) SAs, (c) CAHs. Lag time for VOC degassing (i.e. drying) prior to nanoparticle deposition at 10 minutes.
Figure 9:
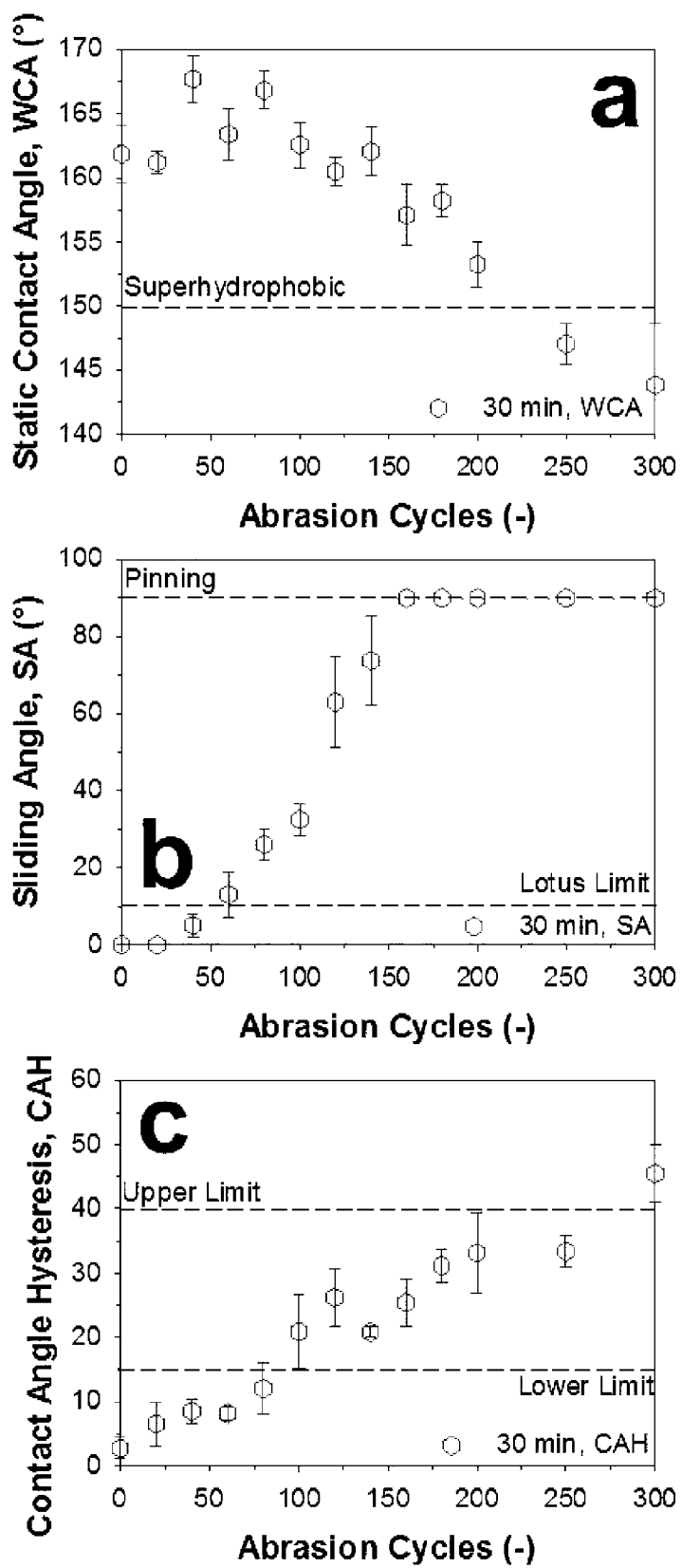
FIG. 9: graphs demonstrating time-optimized abrasion-wetting characterizations. (a) WCAs, (b) SAs, (c) CAHs. Lag time for VOC degassing prior to nanoparticle deposition at 30 minutes.
Figure 10:
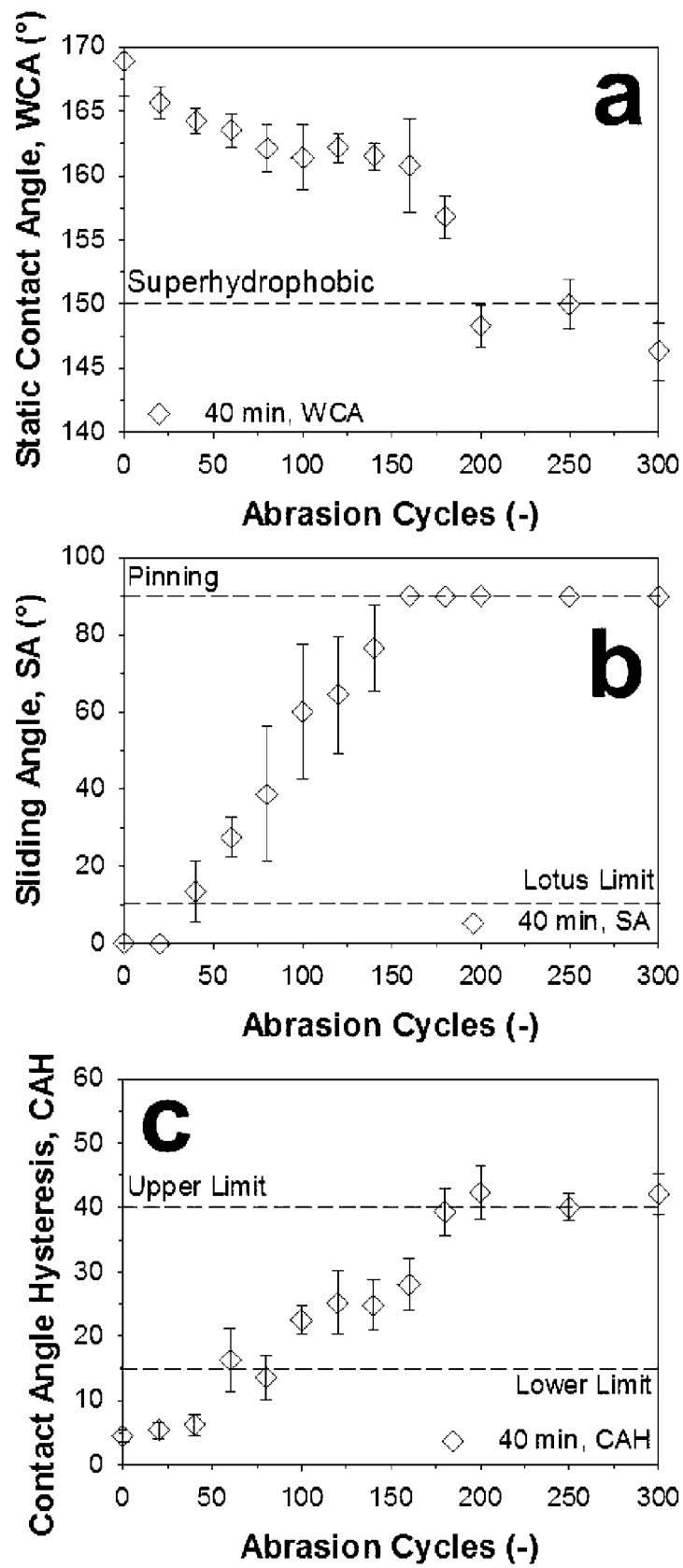
FIG. 10: graphs demonstrating time-optimized abrasion-wetting characterizations. (a) WCAs, (b) SAs, (c) CAHs. Lag time for VOC degassing prior to nanoparticle deposition at 40 minutes.
Figure 11:
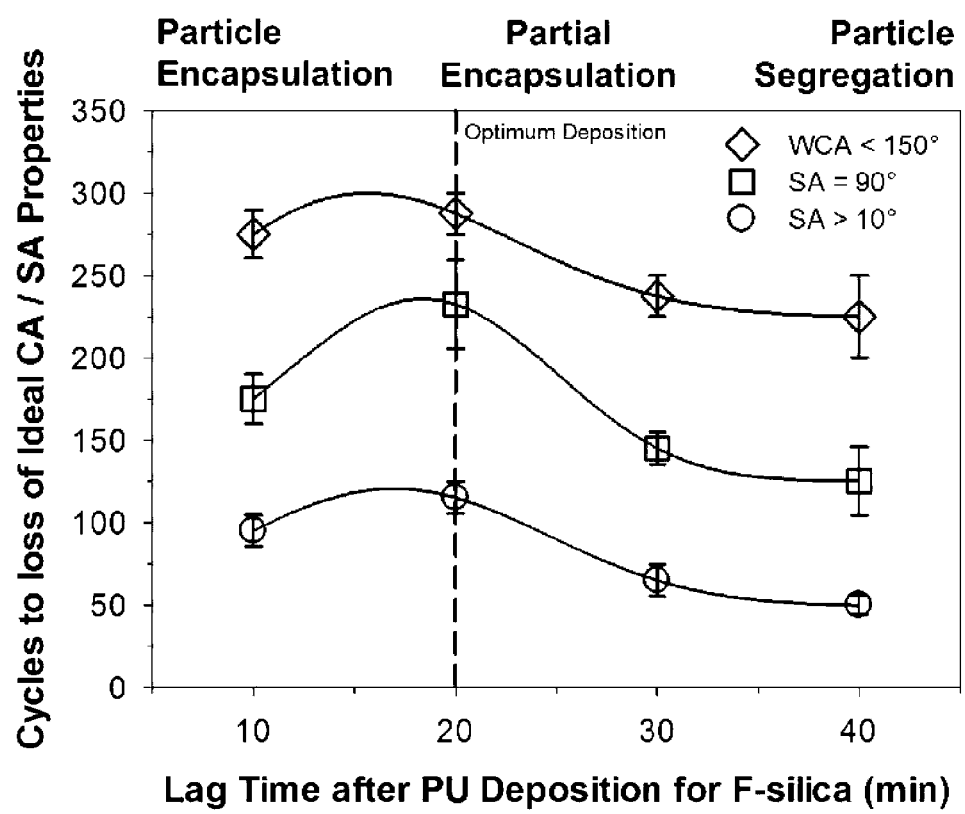
FIG. 11: Optimization of VOC degassing (25° C., laboratory environment: 50-60% humidity, kept out of direct sunlight) analyzed through abrasion testing from 10 to 40 minutes. At less than 10 minutes (e.g. 5 minutes), as-developed coatings were not superhydrophobic.

An ideally performing superhydrophobic interface was synthesized (FIG. 5a), through the spray-deposition of fluoro-functionalized silica (F—$SiO_2$) as described in the Experimental Section (FIG. 7). Deposition of the functional F—$SiO_2$ layer onto the micro-nano hierarchical IPNs resulted in enhanced nanoroughness ($R_{q2}$) from 1235±85 nm to 2420±120 nm at WLI, 500× and ultra-low surface energy. An optimal delay of 20 minutes after deposition of the PU-PMMA was found to improve particle encapsulation through optimized volatile organic content (VOC) degassing (FIG. 5a). In this context, "degassing" refers to allowing the volatile materials to evaporate. This optimum deposition timeframe was confirmed via optical microscopy of the interface with respect to time and cyclic abrasion optimization (FIG. 8-11). VOC degassing was optimised (25° C., laboratory environment (50-60% humidity), kept out of direct sunlight), and was analyzed through optical microscopy from 0 minutes to 18 hours. The largest morphological changes from an agglomerated coating (0 mins) to a micro-bulbous coating (marshmallow-like) took place between 20 to 40 minutes, in close alignment with the optimal abrasion-resilience domains. The resulting composite IPN (PU-PMMA-$FSiO_2$) had an extremely superhydrophobic wetting properties with a near-undetectable sliding angle of ca. 0° (FIG. 5e).

Transparency and Substrate Independency

Figure 12:
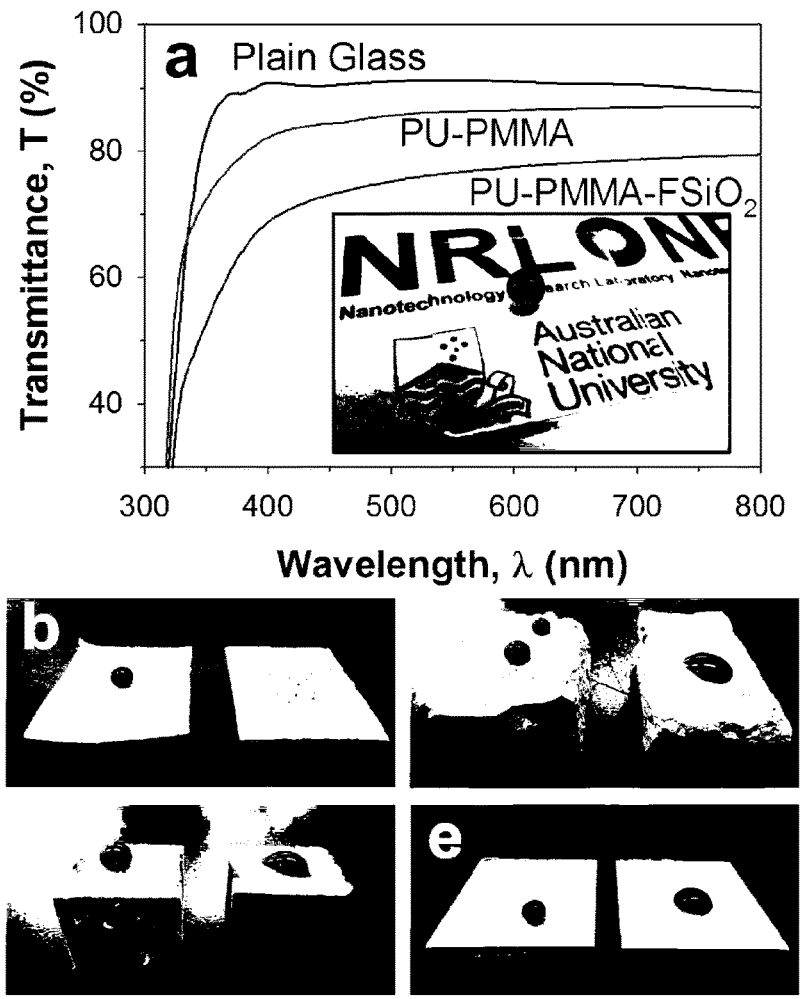
FIG. 12: (a) Transmittance of plain glass substrates vs. different coating layers (at 600 nm) and the optimized coating layer (inset of sample showcasing excellent transparency). Bi-layer PU-PMMA IPN, F—SiO$_2$ coating on a variety of substrates, including (b) absorbent paper towel, (c) bricks (clay-stone), (d) wood (e) aluminium with minimal hazing. In each of b to e, the left hand sample is coated with a superhydrophobic coating according to the invention, and the right hand sample is uncoated.
Figure 13:
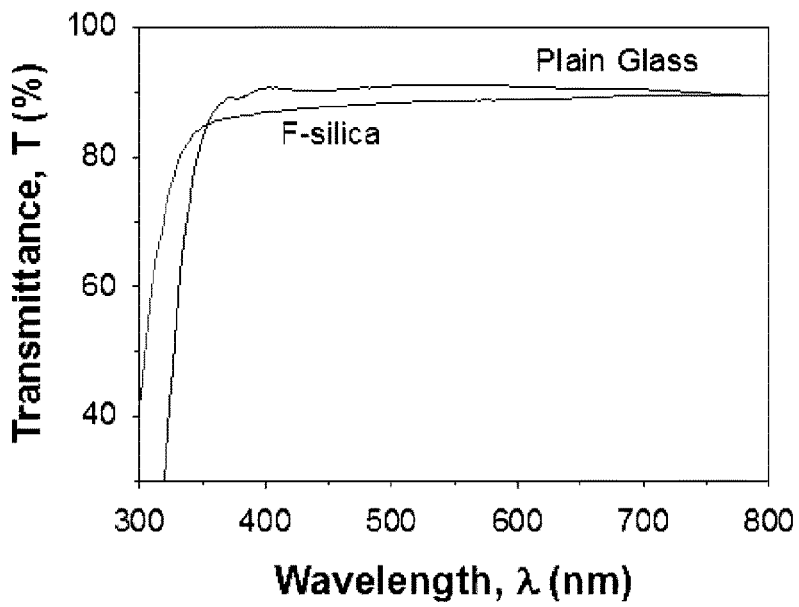
FIG. 13: UV-vis analysis of fluorosilica-coated glass and plain glass at 600 nm.
Figure 14:
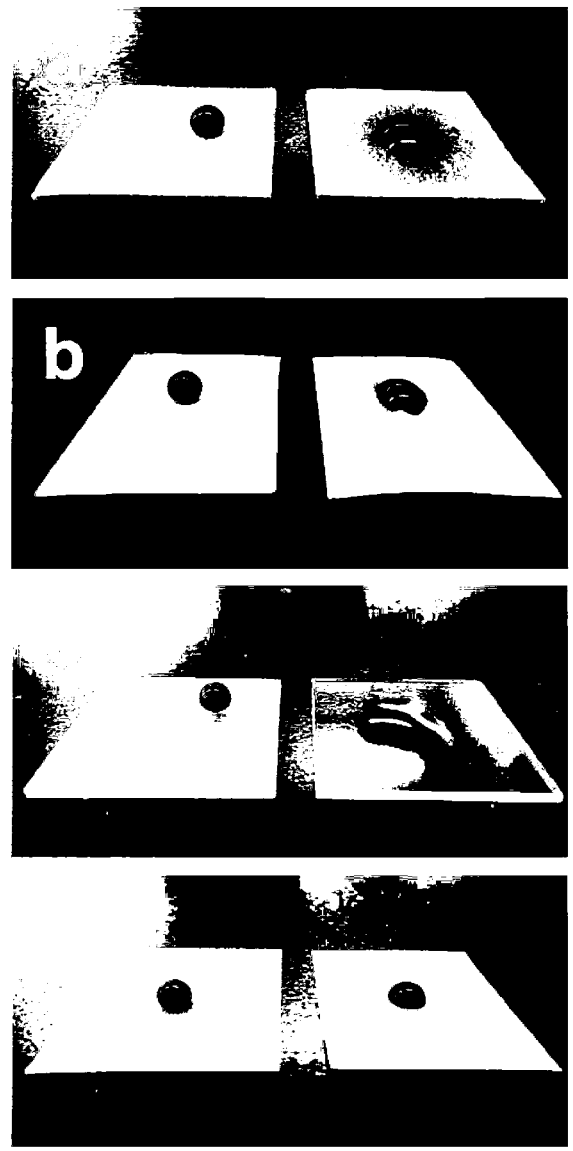
FIG. 14: photographs illustrating multi-substrate compatibility, showing films according to the invention on (a) cardboard, (b) writing paper, (c) glass and (d) kapton (polyimide). In each photograph, the left hand sample is coated with a superhydrophobic coating according to the invention, and the right hand sample is uncoated.

The transmittance spectra of the PU-PMMA-$FSiO_2$ layers and PU-PMMA are shown in FIG. 12a against plain glass. At a wavelength of 600 nm, the net loss in transmittances were measured at 5.0 and 14.8% for the F—$SiO_2$, PU-PMMA and PU-PMMA-$FSiO_2$ surfaces, respectively. The transmittance drops between PU-PMMA-$FSiO_2$ from PU-PMMA were non-linearly compounded (FIGS. 12a and 13), and can be attributed to the decoration of the PU-PMMA interface with the F—$SiO_2$, resulting in higher refractive index contrasts at the interface. This 14.8% transmittance loss did not affect the optical transparency of glass, with printed text and images clearly visible when placed directly behind the PU-PMMA-$FSiO_2$ coated glass slides (FIG. 12a). The substrate-independent self-assembly of the PU-PMMA-$FSiO_2$ surfaces was demonstrated on a multitude of materials, namely absorbent paper towel, clay-stone based bricks, wood and aluminum (FIGS. 12b-e and 14). The PU-PMMA formulation was also broadly applicable, and demonstrated compatibility with flame-made superhydrophobic coatings, achieving stabilization of these ultra-fragile fractal-like structures.

Robust Superhydrophobicity and Long-Term Surface Damage Analysis

Figure 15:
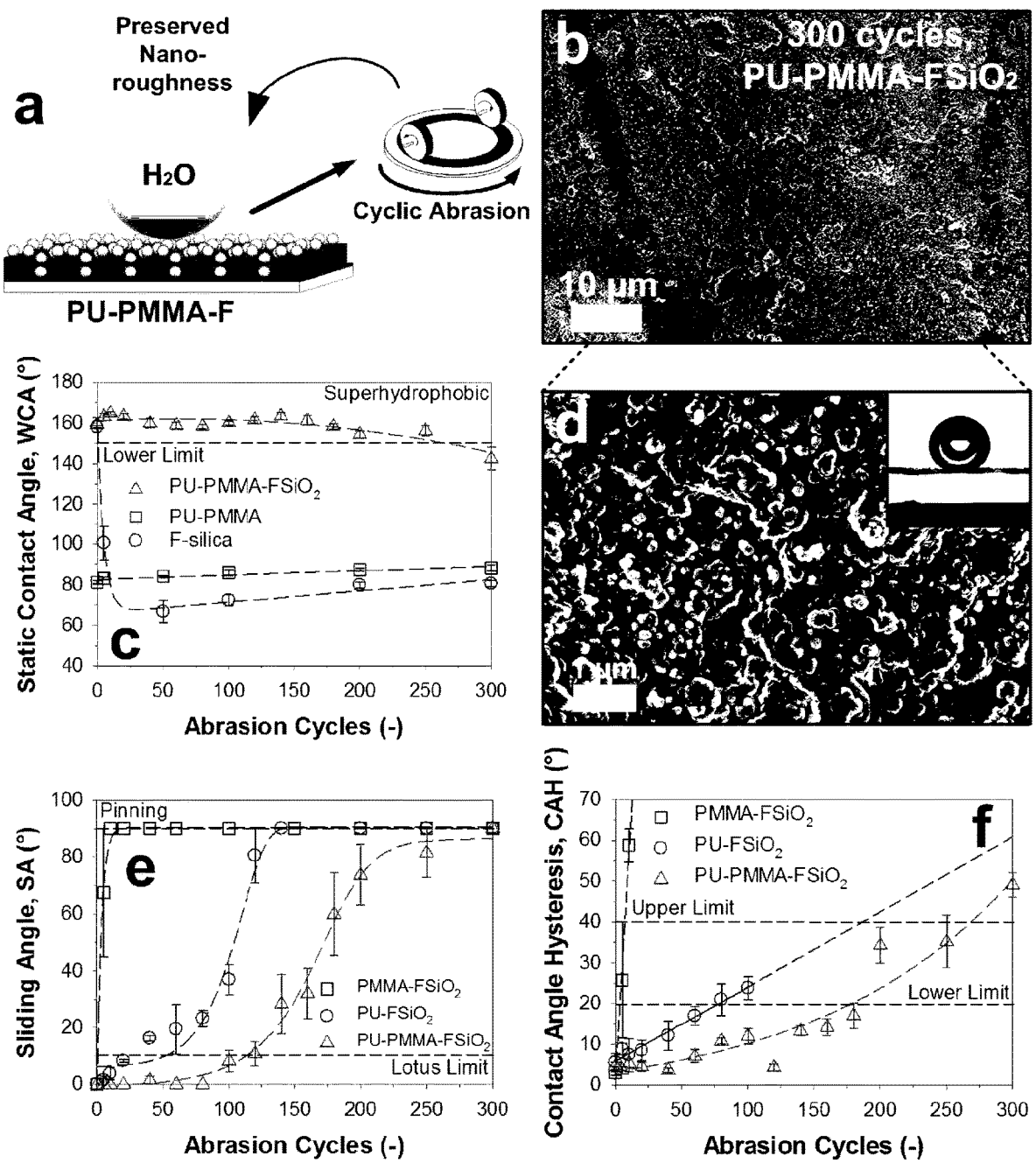
FIG. 15: (a) Tandem abrasion-wetting characterizations. Wetting characterization of cyclically abraded samples, with assessment of (c) static contact angles of PU-PMMA-FSiO$_2$ with PU-PMMA IPN and F—SiO$_2$ controls. SEM analysis at the loss of superhydrophobicity (WCA<150°) of (b) PU-PMMA-FSiO$_2$, 300 cycles, with (d) high magnifications showing the persistent presence of nanoparticles. (e) Sliding angles and (f) contact angle hystereses of F—SiO$_2$ coated crosslinked PU, PMMA and PU-PMMA IPN revealed functionality damage resilience of the latter.
Figure 16:
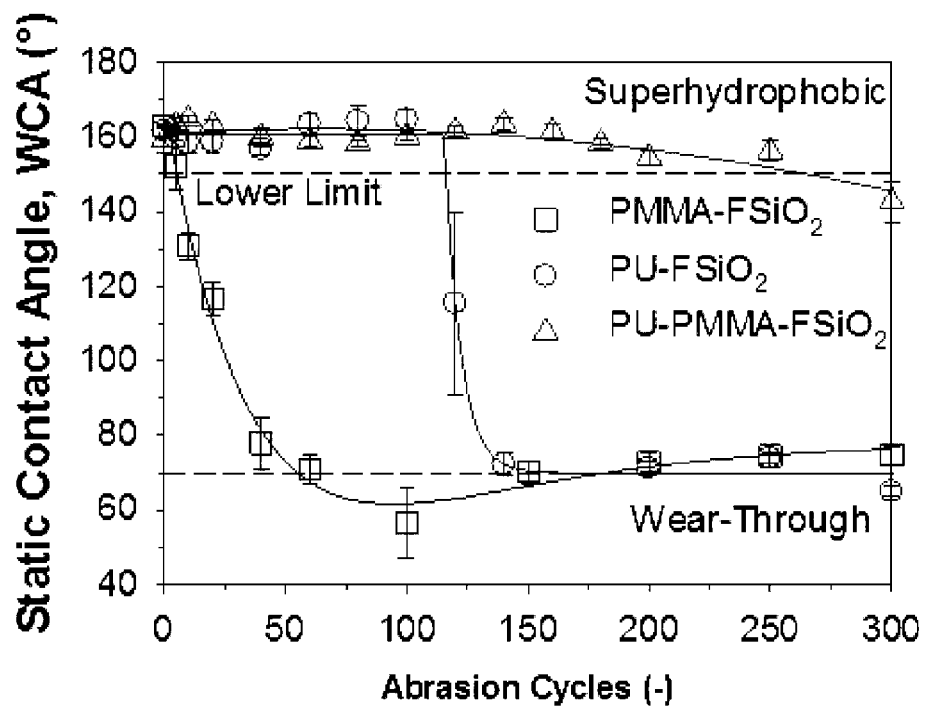
FIG. 16: Tandem abrasion-wetting analysis for crosslinked polymeric controls with fluoro-silica deposition.

Tandem wetting-abrasion analysis (FIG. 15a) of the PU-PMMA-$FSiO_2$ surfaces highlighted the drastic enhancement in mechanical stability over the PU, PMMA and pure F—$SiO_2$ layers used as controls. The pure layers of F—$SiO_2$ deposited on the same glass substrates had an initial WCA of ca. 158° but lost their superhydrophobicity after merely 5 cycles, resulting in a WCA of 101±8° and revealing extensive layer wear-through (FIG. 15a). In stark contrast, the PU-PMMA-$FSiO_2$ interfaces preserved superhydrophobicity with WCA>150° for up to 250 cycles, revealing a mere WCA drop to 143±6° after the $300^{th}$ cycle (FIG. 15a). This is in good agreement with the performance of the bare monolayers of PU-PMMA. These bare IPN layers preserved their inherent hydrophilic wetting properties with a WCA of ca. 80-88° during the entire 300 cycles of abrasion, with no wear-through nor any other visible damage (FIG. 15a). The other hierarchical support structures provided by cross-linked PMMA and PU controls further highlighted the importance of integrating the soft rubbery polyurethane with the polyacrylic component (FIG. 16). PMMA supported F—$SiO_2$ layers experienced a rapid sharp drop in WCA, losing superhydrophobicity after only 10 cycles with WCAs dropping to 131±4°. After 40 cycles of abrasion, complete wear-through was observed with WCAs reaching 78±7° (FIG. 16). The PU controls supported F—$SiO_2$ layers performed better, with excellent preservation of superhydrophobicity until extensive wear-through occurred at 100-140 cycles (FIG. 16). For these PU-$FSiO_2$ surfaces, a sharp drop in WCA occurred during the $100^{th}$ to $120^{th}$ cycle from 165±3° to 115±24° that was mirrored by steep SA increments from 37±5° to 81±10°.

Sliding angle analysis (FIG. 15e) of the PU-PMMA-$FSiO_2$ coatings revealed robust preservation of a pristine lotus effect with SA below 10° for up to 120 cycles, with a slow but continued rise in SA with increasing abrasion cycles up to 300 cycles. This was indicative of excellent elastic properties of the hierarchical structure that were capable of particle retention and resilient to extended abrasive damage. These results were supported by CAH analysis, depicting a smaller drop in dewetting properties per abrasion cycle as compared to PU-$FSiO_2$ and PMMA-$FSiO_2$ variants (FIG. 15f). At high SEM magnification the abraded PU-$FSiO_2$ and PMMA-$FSiO_2$ surfaces revealed evidence of coating tears at the 50 and 150 abrasion cycles, respectively.

Although the casted PMMA coatings were notably rubbery during tensile testing (FIG. 2d, the failure mode of spray-deposited acrylic coatings revealed unmistakable brittle fracturing distinguished by sharp edges (FIGS. 17d, g). The damaged PU surfaces, instead, were in line with the typical failure mode of rubbery materials, with plastic yielding failure characteristic of ductile fracture (FIG. 17h). The remaining shreds of PMMA-based coatings were sporadically smooth, with a limited presence of the functional F—$SiO_2$ layer. The ease of delamination between the PMMA and F—$SiO_2$ interfaces explain the rapid loss of superhydrophobicity upon abrasion damage (FIG. 17g). In contrast, the PU-based surfaces had better particle retention capabilities than PMMA, with a noticeable particle-loaded surface even along fracture lines (FIG. 17h). However, the ductile fracturing of these PU surfaces eventually led to patchy wear-through and loss in functionality by the $150^{th}$ cycle (FIGS. 17e, h).

As a result, the superior mechanical properties of the PU-PMMA are attributed to the successful integration of the particle retention capabilities of PU, a soft yielding material interface, into the hybrid PU-PMMA IPN This gave rise to a tough but ductile interface that was capable of yielding under stress while retaining the key functional nanoparticle layer without fracture. The interlacing of PMMA's crystalline polymeric network preserved the integrity of the IPN, and vastly promoted wear resistance, permitting the well-sustained damages without wear-through. Notably, high magnification SEM analysis of the PMMA-PU after 300 abrasion cycles (FIGS. 15b, d) only revealed minimal ironing of the F—$SiO_2$ functional layer, which accounts for the highly water repulsive surface properties (FIG. 15d inset). However, randomly scattered gouges and scratch-induced tears were present by the $300^{th}$ cycle (FIGS. 17f and 18), which eventually resulted in the loss of superhydrophobicity. Efficiency of particle retention, mapped through WLI nanoroughness ($R_{q2}$) was estimated across abrasion cycles, demonstrating a gradual drop down to 1.28±0.01 μm (FIG. 19a). This accounts for the flattening of the nano- and micro-F—$SiO_2$ agglomerates that were initially detected by WLI. However, microroughness ($R_q$) analysis (FIG. 19b) suggests a generally well-preserved micro-level roughness under the now dense F—$SiO_2$ layers, with minimal variation before and after abrasion, indicating excellent stability of the sub-layered micro-rough marshmallow-like structures (FIGS. 5c, e). The combination of excessive surface ironing and microscopic tears in the hybrid IPN eventually resulted in the flat, but a highly hydrophobic coating after 300 abrasion cycles.

Touch Resilience, UV, Acid, and Oil Contamination Resilience

The superhydrophobic PU-PMMA-$FSiO_2$ coatings were tested for various real-world applications and damage tests. These included the finger-wipe test, UV-exposure, acid-exposure as well as oil contamination. The finger-wipe test clearly demonstrated the finger-touch resilience of the PU-PMMA supported F—$SiO_2$ coating as compared to the bare F—$SiO_2$ coating, with full functional dewetting properties after a real-world[5] damage situation. These coatings demonstrated superiority to the current state-of-the-art finger-wipe tested resistant coatings that are optically non-transparent due to the use of a highly concentrated composite paint-like system.

Figure 20:
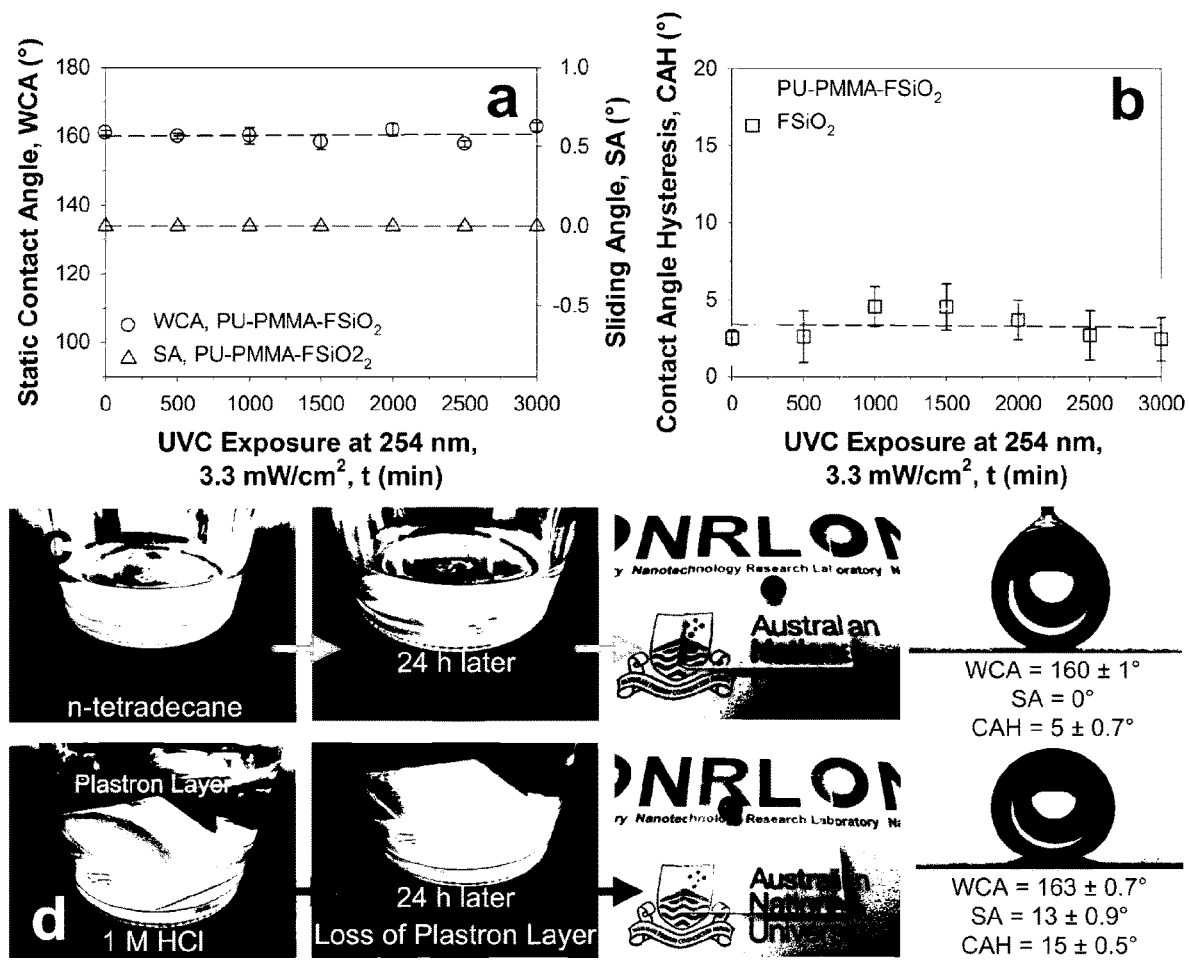
FIG. 20: Real-world radiation and chemical damage resilience. (a-b) UV-C (254 nm) resilience of F—SiO$_2$ integrated PU-PMMA IPNs, with minimal observable impacts on SA, WCA and CAH during all 3000 minutes of testing. Immersion of F—SiO$_2$ integrated PU-PMMA IPNs into (c) oil (tetradecane) and (d) acid (1M HCl) for 24 hours, with the subsequent loss of plastron layers in both, but demonstrated excellent damage resilience and readily recovered functionalities.
Figure 21:
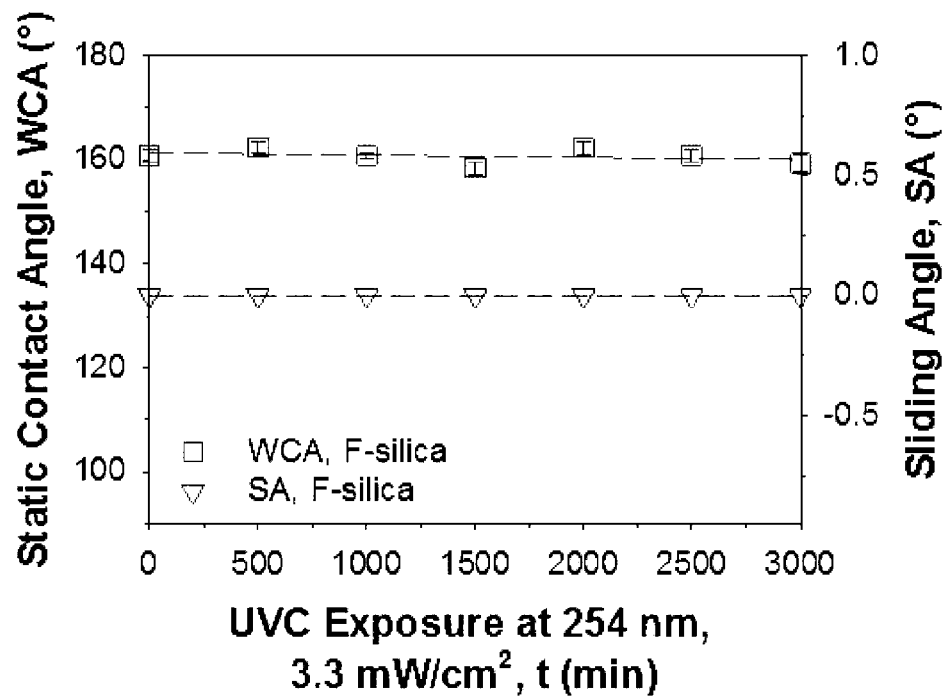
FIG. 21: Stability of F—SiO$_2$ on glass under extended exposure to high intensity UVC.

UV-exposure tests (UV-C, 254 nm, 3.3 mW $cm^{-2}$) were also conducted up to 50 h, without any discernible changes in SA or WCA measurements (FIGS. 20a and 21). The measured CAHs (FIG. 20b) were also very stable and within the standard batch-to-batch variations (±5°). This demonstrates the negligible losses in dewetting functionality that may arise from the degradation of the IPN under intense UV exposure and its superior photochemical stability over other surfaces. Lastly, 24 h extended immersion into an oil analog (n-tetradecane) (FIG. 20c) and concentrated acid (1M HCl) (FIG. 20d) resulted in minimal impact on the superhydrophobicity of the PU-PMMA-$FSiO_2$ interfaces. The acid-resistance easily matches performance demonstrated by current state-of-the-art acid-resistant superhydrophobic coatings. The ease of oil-decontamination was also demonstrated using a jet of ethanol after retrieval. This is of significant impact as infiltration of oil into superhydrophobic materials is typically expected to cause micro-reorganization, resulting in smoother surfaces while impeding recovery of superhydrophobicity. These findings are superior to the state-of-the-art superhydrophobic materials/coatings designed for these applications.

Figure 23:
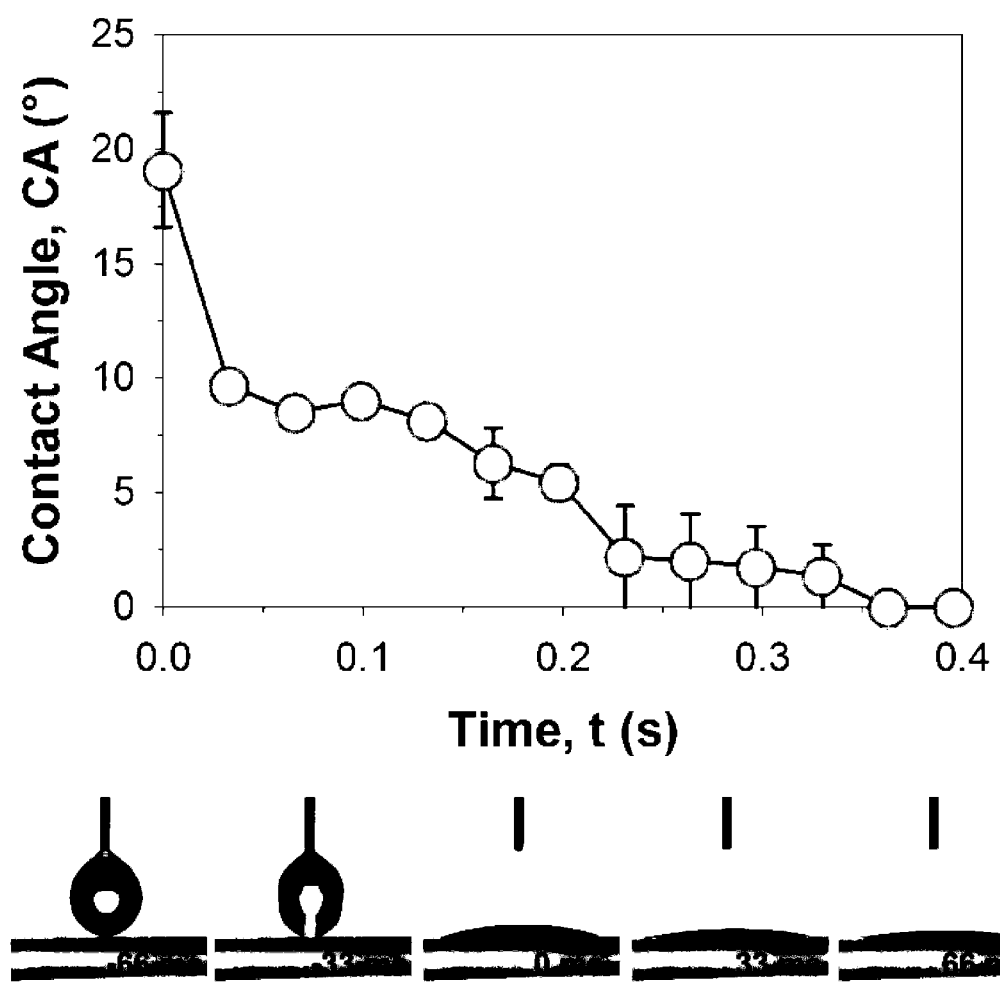
FIG. 23: Contact angle vs. time as a water droplet (5 μL) is added to a superhydrophilic surface according to the present invention.

FIG. 23 illustrates a superhydrophilic surface according to the present invention. Thus in FIG. 23 at the bottom is a series of photographs showing a 5 microlitre droplet of water being applied to the surface. At the time that the droplet makes contact (0 ms), it spreads rapidly to a surface film with negligible contact angle.

Experimental Section

Polyurethane-Acrylic (PU-PMMA) Colloid Preparation

Figure 22:
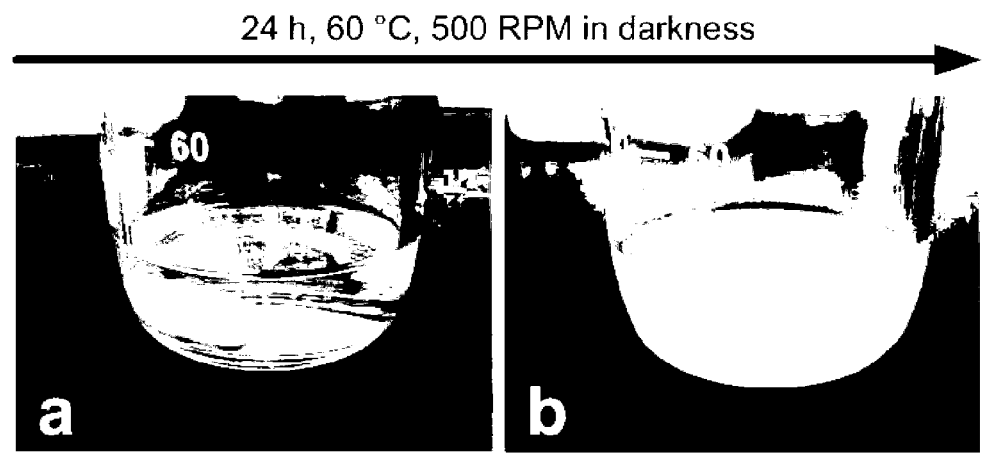
FIG. 22: Reaction of (a) PU-PMMA hybrid pot to give a (b) sprayable colloidal suspension of PU-PMMA IPN solution. As-synthesized colloid is stable for at least 6 months without any signs of settling.

A cross-linking polymethyl methacrylate mixture (Pot A) was first prepared with the addition of 10 mL of acetone (Sigma Aldrich, ≥99.5%), followed by 1.01 mL of methyl methacrylate (Sigma Aldrich, 99%), 47.2 μL of trimethylopropane trimethacrylate (Sigma Aldrich, 90%) and 30.4 μL of 2,2'-azobis(2-methylpropionitrile) solution (Sigma Aldrich, 0.2M in toluene). Almost simultaneously, a cross-linking polyurethane mixture (Pot B) was also prepared with the addition of 10 mL of m-xylene (Univar, 99%), followed by 0.220 g of 1,1,1-tris(hydroxymethyl)propane (Sigma Aldrich, ≥98%), which was stirred rapidly (1500 RPM) for 5 minutes to disperse the solids. 1.01 mL of polytetramethylene ether glycol (Sigma Aldrich, $M_n$ about 2000) was added and the resulting mixture allowed to under further stirring for 5 minutes. 0.568 mL of tolylene-2,4-diisocyanate (Sigma Aldrich, 95%) was then added into the mixture of (poly)ols. The PTHF and TDI were first melted in a drying oven before addition. Pot A was then vortex mixed and poured directly into Pot B, forming the reaction Pot C, which was clear. An initiator, dibutyltin dilaurate (Sigma Aldrich, 95%, 5 microlitres) was then added into Pot C before the reaction was sealed and allowed to commence at 60° C. for 24 hours in darkness with a constant stirring rate of 500 RPM to form a sprayable colloidal dispersion (FIG. 22). Excess isocyanate groups were added to compensate for its high reactivity that is known to lead to some side networking reactions. The post-reaction mixture is known as the sprayable PU-PMMA colloid (0.15 g $mL^{-1}$), which is made up of 66 w/w PU and 34 w/w PMMA. Homopolymeric cross-linked polyurethane and polymethyl methacrylate controls (FIG. 6) were prepared under identical reaction conditions, utilizing the same solvent, crosslinkers and initiators (AIBN and DD) ratios while excluding the constituents of the other polymer. Due to fundamentally different reaction environments (without its partner polymer), optimal spray-reaction conditions varied slightly, with pure PU being synthesized at 0.075 g mL$^{-1}$ while PMMA was synthesized at 0.4 g mL$^{-1}$. This was performed based on sequential concentration-spectroscopic analysis, aimed at the synthesis of a fluid prepolymeric solution while avoiding gelation. Spray deposition was conducted within 48 hours of reaction stoppage for all samples in efforts to preserve comparative consistency.

Functionalization of Silica Nanoparticles for F—SiO$_2$

A round bottom flask was first charged with 80 mL of dry chloroform (Sigma Aldrich, ≥99%) and purged with dry nitrogen for 30 minutes. 2 g of fumed silica nanoparticles (Sigma Aldrich, 7 nm) with an effective surface area of 395 m$^2$ g$^{-1}$ were then added into the flask under gentle stirring with a further nitrogen purge of 10 minutes. At a graft density of 4 μmol m$^{-2}$, 0.945 mL of 1H,1H,2H,2H-Perfluorooctyldimethylchlorosilane (Novachem) was added into the flask. Reaction was then allowed to proceed at 25° C. at a stirring rate of 500 RPM for 48 hours in an oil bath. Functionalized silica (F—SiO$_2$) were then washed in 3 cycles of dry chloroform (50 mL g$^{-1}$) and dried in a convection oven at 50° C. for 24 hours. Fluoro-silica was re-suspended in acetone (Sigma Aldrich, ≥99.5%), at a concentration of 50 mg mL$^{-1}$ by immersing the 5-10 mL suspension in a sonication bath for 60 minutes with 15 minute intervals of 10 s long vortex mixing. Spectroscopic analysis confirmed the successful functionalization through the formation of peaks from 500 cm$^{-1}$ to 1000 cm$^{-1}$ indicative of CF$_2$ groups (FIG. 7).[17] Thermogravimetric analysis indicates a functionalized w/w percentage of ca. 19.5% (FIG. 7).

Spray Coating of Polyurethane-Acrylic IPNs

Upon completion of synthesis, liquid-based solutions of the superhydrophobic (F—SiO$_2$) and optimized bottom coats (PU-PMMA IPN) can be stored for extended periods (6 months) without losses in functional properties. As developed sprayable PU-PMMA colloids were sprayed at a pressure of 2-3 bars at a flow rate of 0.2 mL s$^{-1}$ from a 10 cm working distance (WD) using an artist's air brush. 5 mL of the pre-polymer mixture (0.15 g mL$^{-1}$) was typically sprayed onto glass substrates with an area of 2.5 cm by 5 cm. A traverse rate of ca. 10 cm s$^{-1}$ is maintained using guide rails on a custom-built spray rig. Optimized sprayable conditions of controls were calibrated (PU, 10 mL, 10 cm WD and PMMA, 1.25 mL, 15 cm) so as to equalize the net deposition mass. Optimized coatings (23 μm thick, 5 mm width, 25 mm length) of PU-PMMA IPNs were immersed (5 mL) into its parent solvents (acetone and xylene) and two other harsh solvents (THF, chloroform) for 2 hours and imaged. These coatings were observed to be insoluble over a period of 24 hours, with minimal swelling when contacting its parent solvents. Notably, they were also insoluble in THF and chloroform, although significant swelling of the coatings occurred, and they broke up mechanically upon swirling. The post-deposition insolubility in harsh solvents is characteristic of successfully developed interpenetrated polymeric networks.

Spray Coating of F—SiO$_2$

F—SiO$_2$ in acetone suspensions (50 mg mL$^{-1}$) were sprayed onto desired (coated or uncoated) substrates at 2-3 bars at a flow rate of 0.2 mL s$^{-1}$ from a 10 cm working distance using an artist's air brush. 2 mL of the suspension was typically sprayed onto coated glass substrates with a dimensional area of 2.5 cm by 5 cm. A traverse rate of ca. 10 cm s$^{-1}$ is maintained using guide rails on a custom-built spray rig. The VOC degassing time prior to the deposition of fluoro-silica was varied and briefly studied between 10 to 40 minutes in optimally developed samples. All coatings were stored for between 24-72 hours in darkness prior to commencement of tests. This enables complete curing, degassing and stabilization of intra-polymer stresses within the material prior to characterizations.

Wetting Analysis

Static water contact angles (WCAs) were measured by placing and averaging 4 drops of deionized water (6.5 μL) on cross-batch (4) sample surfaces using the sessile drop method. Superhydrophobic interfaces demonstrating a sliding angle (SA) with negligible tilt were classified under the SA of 0°. Abrasion damaged interfaces possessed higher SAs were analyzed via a custom-built tilting goniometer. The contact angle hysteresis (CAH) was measured via the drop-in drop-out technique which provided the average advancing contact angle (ACA) at 9 μL and the average receding contact angle (RCA) at 2 μL. 4 cross-batch readings were taken. Dynamic and static images were recorded using a KSV CAM200 contact angle goniometer (Finland) with a heliopan ES43 camera (Japan). The CA, SA and CAH were computed by a commercially available (CAM2008) program. Data was presented as mean±standard errors.

Abrasion Analysis

Quantitative abrasion damage analysis was conducted using a rotary platform abrasion tester with two abrasive CS-10 (Calibrase, U.S.A) wheels (resurfaced with 150 grit discs) at 60 RPM based on the ASTM D4060 Taber standard. The load on each grinding wheel was 250 g. This test method was chosen largely due to its well-assessed and standardized approach. Five samples types were chosen for representation, namely, PU-PMMA-FSiO$_2$, PU-FSiO$_2$, PMMA-FSiO$_2$ as well as F—SiO$_2$ and PU-PMMA IPN controls. Samples were subjected to consecutive tandem abrading cycles (between 0 to 300)—wetting characterizations, enabling complete mapping of abrasion-affected WCAs, SAs and CAHs. Dust and debris were blown off the surfaces simultaneously with a pressurized air gun during cyclic testing.

UV Resistance Analysis

UV resistance was assessed in a short-wave (254 nm) UVC cross-linker (CL1000, Ultra-Violet Products, UK). Exposure times were cycled through 100 minute cycles up to 3000 minutes (50 h). The UV-C exposure experiments were halted after 50 h based on the consideration of the state-of-the-art testing parameters employed for UV-resistant superhydrophobic materials at wavelengths (254-365 nm), intensity (2 mW cm$^{-2}$) and exposure timeline (250-300 minutes). Superhydrophobic testing was conducted after every 100 minute cycles using a jet of water while contact angle measurements were taken every 500 minutes. The UV chamber was heated up by the mercury lamps to 70-80° C. during use, but was cooled down prior to initialization of the next cycle. Exposure intensity was measured at 3.3 mW cm$^{-2}$ via internal calibration of the instrument.

Contamination Analysis

As-synthesized optimal coatings were assessed for contamination resistance by soaking in oil, acid and a caustic base for 24 hours at 25° C. Analogs for oil, acid and base were represented by n-tetradecane, 1M HCl and 1M NaOH respectively. Post-contamination interfaces were briefly cleaned by rinsing with ethanol (oil) and deionized water (corrosives) respectively. Wetting studies were conducted after blow drying these interfaces with an air gun.

Thermal and Mechanical Analysis

High and low temperature differential scanning calorimetry (DSC) analysis were conducted using the STA 8000 (Perkin Elmer, U.S.A) and DSC 1 STARe (Mettler Toledo, Switzerland) coupled to an immersion cooler (Huber TC100, Germany), respectively using alumina and aluminum pans, from 50 to 900° C. and −100 to 200° C. at 10° C. min$^{-1}$ ramp under nitrogen. No annealing cycles were conducted to present accurate properties of as-synthesized materials. Thermogravimetric (TGA) and differential thermogravimetry (DTG) analysis were also simultaneously coupled to the high temperature DSC analysis. TGA analysis was also used to assess nanoparticle functionalization. Mechanical properties of polymeric IPNs (including controls) were mapped through a series of stress-strain tests using a tensile tester via a Instron 4505 (U.S.A), with a 10 N load cell and an extension rate of 1 mm min$^{-1}$ until coating breakage (20-25° C., 20-30% relative humidity). The Young's modulus was automatically computed by the Bluehill® software. PU-PMMA and PU coatings were spray-casted at approximately 4-6 mm (width) with 20-30 μm (thickness) with a fixed test length of 10 mm. As spray-casted PMMA coatings were too brittle for the required manipulation in tensile testing, they were instead liquid-casted at 30-70 μm (thickness) and room temperature drying-curing for 72 hours prior to use. As such, the liquid-casted PMMA coatings should not be deemed directly comparable to its sister coatings. Coating thicknesses were analyzed via a coating thickness gauge (DT-156) while widths were measured via vernier calipers. Variations in material and coating uniformity were assessed across 5 measurements. Data was presented as mean±standard errors. The most optimal runs amongst the repeat measurements were presented as a true stress vs. strain graph.

Surface Analysis

Selected samples were analyzed via scanning electron microscopy (Zeiss UltraPlus analytical scanning electron microscope (FESEM) at 3 kV). Prior to examination, SEM specimens were platinum sputter-coated for 2 minutes at 20 mA. Fourier Transform Infrared-Attenuated Total Reflectance (FTIR-ATR, Bruker-Alpha, U.S.A) was performed (24 scans from 400 to 4000 cm$^{-1}$) on all as-synthesized samples and pre-synthesis constituents to verify all intended chemical reactions (functionalization, cross-linkages, polymerizations). UV-vis analysis was conducted using a microplate reader (Tecan 200 PRO, Switzerland) from 300 to 800 nm with 10 scans per cycle under the Absorbance Scan mode. Time-controlled morphological variations were conducted using a light microscope (Nikon Eclipse E200, TV lens 0.55×DS) on coated glass substrates. This was conducted immediately after spray coating the PU-PMMA IPN, which was then optically micro-photographed in 2-minute cycles up to 1 hour, before being analyzed in hourly cycles up to 3 hours and finally at 18 hours (steady state). Surface analysis was also conducted via white light interferometer (Veeco, Wyko NT9100, USA), which provided 50× to 500× magnification with a field of view (FOV) of 1× via the vertical scanning interferometry (VSI) mode. The WLI technique enabled the mapping of the micro-nano-structural profiles before and during abrasion damage, improving the understanding behind the naturally-agglomerated structures for abrasion-resilience. A magnification of 50× provided macro-view of the surfaces but did not provide micro- or nanoscale analytical accuracy. Magnifications of 200× and 500× provided micro- and nanoscale analysis accuracy, and were used broadly to analyze potential micro- and nanoscale morphological variations. A backscan of 50 μm and length of 25 μm was used with a modulation of 3% in order to cover the maximum peak-to-trough heights of hierarchical coatings averaging 3 and 2 repeats on samples at 200×/500× respectively.

CONCLUSIONS

The substrate-independent synthesis of ultra-robust and transparent superhydrophobic surfaces was demonstrated for a novel sprayable polyurethane-acrylic IPN system. IPN coatings integrated with fluoro-functionalized silica nanoparticles had superior mechanical stability and abrasion durability with up to more than 50 times improvement against the loss of superhydrophobicity. The greatly enhanced robustness is attributed to the soft yielding elastic-plastic deformations exhibited by the highly roughened nano-micro hierarchical polyurethane-acrylic texture. This tough and ductile material enabled excellent nanoparticle retention properties, contributing immensely to the longevity of the functional superhydrophobic layers during abrasion damage. Real-world damage including abrasion, physical touch, high intensity shortwave UVC exposure (254 nm, 3.3 mW cm$^{-2}$, 50 h), extended concentrated acid immersion (1M HCl, 24 h) and oil contamination (24 h) were easily withstood with negligible impacts on the superhydrophobicity and transparency. This highly performing sprayable polyurethane-acrylic IPN is a low-cost and highly scalable platform for the toughening of fragile hierarchical surface, and thus an enabling-technology for numerous applications.

The invention claimed is:
1. A process for making a coating comprising an interpenetrating polymer network, said process comprising the steps of:
   a) making a colloidal suspension comprising the steps of:
      preparing a polymerization mixture comprising:
         (i) a non-crosslinking acrylic monomer selected from an acrylate ester or a methacrylate ester;
         (ii) a cross-linking acrylic monomer selected from a diol di(meth)acrylate, a triol tri(meth)acrylate, a tetraol tetra(meth)acrylate or a pentaol penta(meth)acrylate;
         (iii) an azo initiator;
         (iv) a polyol selected from a triol, a tetraol or a pentaol;
         (v) a polyether diol;
         (vi) a bisisocyanate; and
         (vii) an organic solvent
      adding a polyurethane polymerization catalyst to the polymerization mixture; and heating the polymerization mixture to at least a 10 hour half-life temperature of the free radical initiator, wherein the colloidal suspension comprises colloidal particles suspended in an organic solvent, wherein the colloidal particles comprise an interpenetrating polymer network, and wherein the interpenetrating polymer network comprises a cross-linked polyurethane and a polyacrylic;

b) applying the colloidal suspension to a surface to produce a coated surface, wherein the colloidal suspension is applied by spraying; and c) applying a particulate solid to the coated surface before the coated surface has completely dried, wherein substantially the entire surface of the particulate solid is hydrophobic.

2. The process according to claim 1, wherein the colloidal suspension has a viscosity of less than about 1000 cP.

3. The process according to claim 1, wherein the colloidal suspension has a solids content of from about 5 to about 25% w/v.

4. The process according to claim 1, wherein the particulate solid has a mean particle size of between about 5 and about 20 nm.

5. The process according to claim 1, further comprising a step of functionalizing the entire surface of the particulate solid with hydrophobic organic groups prior to step b), to produce a hydrophobic particulate solid for use in step b).

6. The process of claim 1, wherein the particulate solid is a hydrophobic fumed silica.

7. The process of claim 1, wherein the particulate solid is perfluoroalkyl-functionalised particles.

8. The process according to claim 1, wherein the particulate solid prior to step b) is in suspension in an organic solvent and is applied in step b) by spraying.

9. The process of claim 1, further comprising the step of waiting following the application of the colloidal suspension and before application of the particulate solid, said waiting being for a period of from about 10 to about 100 minutes.

10. The process of claim 1, wherein the particulate solid is at least partially wetted by the colloidal suspension after application to the coated surface.

11. The process of claim 1, wherein the free radical initiator has a 10 hour half-life temperature of from about 50 to about 70° C.

12. The process of claim 1, wherein the organic solvent dissolves each of i to vi.

13. The process of claim 1, wherein the step of heating is conducted in the dark.

14. The process of claim 1, wherein the colloidal suspension has a mean colloid size of between about 200 and about 1000 nm.

15. The process of claim 9, wherein said waiting is for a period of from about 10 to about 40 minutes.

\* \* \* \* \*